(12) United States Patent
Long et al.

(10) Patent No.: US 11,108,230 B2
(45) Date of Patent: Aug. 31, 2021

(54) POWER MANAGER WITH RECONFIGURABLE POWER CONVERTING CIRCUITS

(71) Applicant: GALVION SOLDIER POWER, LLC, Southborough, MA (US)

(72) Inventors: David N. Long, Northborough, MA (US); Nicholas J. Piela, I, Wilbraham, MA (US)

(73) Assignee: Galvion Soldier Power, LLC, Southborough, MA (US)

( * ) Notice: Subject to any disclaimer, the term of this patent is extended or adjusted under 35 U.S.C. 154(b) by 187 days.

(21) Appl. No.: 15/774,380

(22) PCT Filed: Oct. 26, 2016

(86) PCT No.: PCT/US2016/058922
§ 371 (c)(1),
(2) Date: May 8, 2018

(87) PCT Pub. No.: WO2017/087130
PCT Pub. Date: May 26, 2017

(65) Prior Publication Data
US 2020/0125151 A1    Apr. 23, 2020

Related U.S. Application Data

(60) Provisional application No. 62/257,995, filed on Nov. 20, 2015.

(51) Int. Cl.
*H02J 1/10* (2006.01)
*H02J 1/08* (2006.01)
(Continued)

(52) U.S. Cl.
CPC .............. *H02J 1/102* (2013.01); *G06F 1/263* (2013.01); *G06F 1/266* (2013.01);
(Continued)

(58) Field of Classification Search
CPC .. H02J 1/102; H02J 7/0029; H02J 1/08; H02J 7/0021; H02J 7/0068; H02J 1/082;
(Continued)

(56) References Cited

U.S. PATENT DOCUMENTS

| 4,044,268 A | 8/1977 | Hammel et al. |
| 4,589,075 A | 5/1986 | Buennagel |

(Continued)

FOREIGN PATENT DOCUMENTS

| EP | 2230743 | 11/2013 |
| WO | 2006/126023 | 11/2006 |

(Continued)

OTHER PUBLICATIONS

International Search Report and Written Opinion for International Application No. PCT/US2020/033207, dated Jul. 30, 2020.
(Continued)

*Primary Examiner* — Daniel Cavallari
(74) *Attorney, Agent, or Firm* — Day Pitney LLP; George N. Chaclas

(57) ABSTRACT

A portable power manager device (100) includes a DC power bus (110) and a plurality of device ports (141, 142, and 143). A primary device port (143) is connectable to the DC power bus over a primary power channel that does not include a DC to DC power converter. A plurality of secondary device ports (141, 142) is each connectable to the DC power bus over a different reconfigurable power channel (151, 152). Each reconfigurable power channel includes a single one-way DC to DC power converter (220, 221). Each reconfigurable power channel is configurable by a digital data processor as one of three different circuit legs (230, 232, and 234). Leg (230) provides output power conversion. Leg (232) provides input power conversion. Leg (234) provides bi-directional power exchange without power conversion.

23 Claims, 8 Drawing Sheets

(51) Int. Cl.
*H02J 7/00* (2006.01)
*G06F 1/26* (2006.01)
*G06F 13/40* (2006.01)
*H02M 3/04* (2006.01)

(52) U.S. Cl.
CPC ............ *G06F 13/4022* (2013.01); *H02J 1/08* (2013.01); *H02J 7/0021* (2013.01); *H02J 7/0029* (2013.01); *H02J 7/0068* (2013.01); *H02M 3/04* (2013.01); *H02J 1/082* (2020.01)

(58) Field of Classification Search
CPC ...... G06F 1/263; G06F 1/266; G06F 13/4022; H02M 3/04
See application file for complete search history.

(56) References Cited

U.S. PATENT DOCUMENTS

| | | | |
|---|---|---|---|
| 4,910,100 A | 3/1990 | Nakanishi et al. |
| 4,931,947 A | 6/1990 | Werth et al. |
| 5,153,496 A | 10/1992 | Laforge |
| 5,258,244 A | 11/1993 | Hall et al. |
| 5,321,349 A | 6/1994 | Chang |
| 5,570,002 A | 10/1996 | Castleman |
| 5,650,240 A | 7/1997 | Rogers |
| 5,675,754 A | 10/1997 | King et al. |
| 5,754,445 A | 5/1998 | Jouper et al. |
| 5,831,198 A | 11/1998 | Turley et al. |
| 5,898,291 A | 4/1999 | Hall |
| 5,903,764 A | 5/1999 | Shyr et al. |
| 5,914,585 A | 6/1999 | Grabon |
| 5,945,806 A | 8/1999 | Faulk |
| 5,977,656 A | 11/1999 | John |
| 5,986,437 A | 11/1999 | Lee |
| 6,014,013 A | 1/2000 | Suppanz et al. |
| 6,025,696 A | 2/2000 | Lenhart et al. |
| 6,046,514 A | 4/2000 | Rouillard et al. |
| 6,087,035 A | 7/2000 | Rogers et al. |
| 6,137,280 A | 10/2000 | Ackermann et al. |
| 6,198,642 B1 | 3/2001 | Kociecki |
| 6,221,522 B1 | 4/2001 | Zafred et al. |
| 6,246,215 B1 | 6/2001 | Popescu-Stanesti |
| 6,265,846 B1 | 7/2001 | Flechsig et al. |
| 6,271,646 B1 | 8/2001 | Evers et al. |
| 6,366,061 B1 | 4/2002 | Carley et al. |
| 6,366,333 B1 | 4/2002 | Yamamoto et al. |
| 6,370,050 B1 | 4/2002 | Peng et al. |
| 6,376,938 B1 | 4/2002 | Williams |
| 6,396,391 B1 | 5/2002 | Binder |
| 6,459,175 B1 | 10/2002 | Potega |
| 6,476,581 B2 | 11/2002 | Lew |
| 6,485,852 B1 | 11/2002 | Miller et al. |
| 6,492,050 B1 | 12/2002 | Sammes |
| 6,530,026 B1 | 3/2003 | Bard |
| 6,541,879 B1 | 4/2003 | Wright |
| 6,608,463 B1 | 8/2003 | Kelly et al. |
| 6,627,339 B2 | 9/2003 | Haltiner, Jr. |
| 6,628,011 B2 | 9/2003 | Droppo et al. |
| 6,633,823 B2 | 10/2003 | Bartone et al. |
| 6,690,585 B2 | 2/2004 | Betts-Lacroix |
| 6,694,270 B2 | 2/2004 | Hart |
| 6,703,722 B2 | 3/2004 | Christensen |
| 6,707,284 B2 | 3/2004 | Lanni |
| 6,828,695 B1 | 12/2004 | Hansen |
| 6,831,848 B2 | 12/2004 | Lanni |
| 6,925,361 B1 | 8/2005 | Sinnock |
| 6,985,799 B2 | 1/2006 | Zalesski et al. |
| 7,001,682 B2 | 2/2006 | Haltiner, Jr. |
| 7,002,265 B2 | 2/2006 | Potega |
| 7,036,028 B2 | 4/2006 | Zalesski |
| 7,071,660 B2 | 7/2006 | Xu et al. |
| 7,076,592 B1 | 7/2006 | Ykema |
| 7,105,946 B2 | 9/2006 | Akiyama et al. |
| 7,166,937 B2 | 1/2007 | Wilson et al. |
| 7,188,003 B2 | 3/2007 | Ransom et al. |
| 7,203,849 B2 | 4/2007 | Dove |
| 7,212,407 B2 | 5/2007 | Beihoff et al. |
| 7,226,681 B2 | 6/2007 | Florence et al. |
| 7,235,321 B2 | 6/2007 | Sarkar et al. |
| 7,243,243 B2 | 7/2007 | Gedeon |
| 7,256,516 B2 | 8/2007 | Buchanan et al. |
| 7,274,175 B2 | 9/2007 | Manolescu |
| 7,385,373 B2 | 6/2008 | Doruk et al. |
| 7,388,349 B2 | 6/2008 | Elder et al. |
| 7,408,794 B2 | 8/2008 | Su |
| 7,436,687 B2 | 10/2008 | Patel |
| 7,444,445 B2 | 10/2008 | Kubo et al. |
| 7,506,179 B2 | 3/2009 | Templeton |
| 7,531,915 B2 | 5/2009 | Wang et al. |
| 7,541,693 B2 | 6/2009 | Huang et al. |
| 7,618,260 B2 | 11/2009 | Daniel et al. |
| 7,646,107 B2 | 1/2010 | Smith |
| 7,674,543 B2 | 3/2010 | Chiang et al. |
| 7,675,758 B2 | 3/2010 | Artusi et al. |
| 7,683,575 B2 | 3/2010 | Berdichevsky et al. |
| 7,701,082 B2 | 4/2010 | Lazarovich et al. |
| 7,778,940 B2 | 8/2010 | Mazzarella |
| 7,808,122 B2 | 10/2010 | Menas et al. |
| 7,814,348 B2 | 10/2010 | Krajcovic et al. |
| 7,834,479 B2 | 11/2010 | Capp et al. |
| 7,838,142 B2 | 11/2010 | Scheucher |
| 7,844,370 B2 | 11/2010 | Pollack et al. |
| 7,847,532 B2 | 12/2010 | Potter et al. |
| 7,849,341 B2 | 12/2010 | Sugiyama |
| 7,855,528 B2 | 12/2010 | Lee |
| 7,928,720 B2 | 4/2011 | Wang |
| D640,192 S | 6/2011 | Robinson et al. |
| 8,073,554 B2 | 12/2011 | Vezza et al. |
| 8,086,281 B2 | 12/2011 | Rabu et al. |
| 8,103,892 B2 | 1/2012 | Krajcovic |
| 8,106,537 B2 | 1/2012 | Casey et al. |
| 8,138,631 B2 | 3/2012 | Allen et al. |
| 8,140,194 B2 | 3/2012 | Iino et al. |
| 8,164,217 B1 | 4/2012 | Miller |
| 8,178,999 B2 | 5/2012 | Burger et al. |
| 8,193,661 B2 | 6/2012 | Jagota et al. |
| 8,255,090 B2 | 8/2012 | Frader-Thompson et al. |
| 8,279,642 B2 | 10/2012 | Chapman et al. |
| 8,294,307 B2 | 10/2012 | Tsai |
| 8,304,122 B2 | 11/2012 | Poshusta et al. |
| 8,312,299 B2 | 11/2012 | Tremel et al. |
| 8,315,745 B2 | 11/2012 | Creed |
| 8,333,619 B2 | 12/2012 | Kondo et al. |
| 8,352,758 B2 | 1/2013 | Atkins et al. |
| 8,375,229 B2 | 2/2013 | Saeki |
| 8,401,709 B2 | 3/2013 | Cherian et al. |
| 8,447,435 B1 | 5/2013 | Miller et al. |
| 8,455,794 B2 | 6/2013 | Vogel |
| 8,466,662 B2 | 6/2013 | Nania et al. |
| 8,476,581 B2 | 7/2013 | Babayoff et al. |
| 8,494,479 B2 | 7/2013 | Budampati et al. |
| 8,508,166 B2 | 8/2013 | Marcinkiewicz et al. |
| 8,548,607 B1 | 10/2013 | Belz et al. |
| 8,599,588 B2 | 12/2013 | Adest et al. |
| 8,611,107 B2 | 12/2013 | Chapman et al. |
| 8,614,023 B2 | 12/2013 | Poshusta et al. |
| 8,633,619 B2 | 1/2014 | Robinson et al. |
| 8,638,011 B2 | 1/2014 | Robinson et al. |
| 8,643,326 B2 | 2/2014 | Campanella et al. |
| 8,648,492 B2 | 2/2014 | Craig et al. |
| 8,649,914 B2 | 2/2014 | Miller et al. |
| 8,682,496 B2 | 3/2014 | Schweitzer, III et al. |
| D706,711 S | 6/2014 | Robinson et al. |
| 8,775,846 B2 | 7/2014 | Robinson et al. |
| 8,781,640 B1 | 7/2014 | Miller |
| 8,796,888 B2 | 8/2014 | Rice et al. |
| 8,829,713 B2 | 9/2014 | Ishigaki et al. |
| 8,849,471 B2 | 9/2014 | Daniel et al. |
| 8,853,891 B2 | 10/2014 | Soar |
| 8,854,389 B2 | 10/2014 | Wong et al. |
| 8,890,474 B2 | 11/2014 | Kim et al. |
| 8,901,774 B2 | 12/2014 | Yan et al. |
| 8,913,406 B2 | 12/2014 | Guthrie et al. |
| 8,970,176 B2 | 3/2015 | Ballatine et al. |

(56) References Cited

U.S. PATENT DOCUMENTS

| | | | |
|---|---|---|---|
| 9,041,349 B2 | 5/2015 | Bemmel et al. |
| 9,043,617 B2 | 5/2015 | Miki |
| 9,093,862 B2 | 7/2015 | Dennis et al. |
| 9,142,957 B2 | 9/2015 | Malmberg et al. |
| 9,158,294 B2 | 10/2015 | Carralero et al. |
| 9,190,673 B2 | 11/2015 | Venkataraman et al. |
| 9,203,302 B2 | 12/2015 | Kelly |
| 9,207,735 B2 | 12/2015 | Khaitan et al. |
| 9,337,943 B2 | 5/2016 | Mosebrook et al. |
| 9,343,758 B2 | 5/2016 | Poshusta et al. |
| 9,356,173 B2 | 5/2016 | Okandan et al. |
| 9,450,274 B2 | 9/2016 | Vo et al. |
| 9,452,475 B2 | 9/2016 | Armstrong et al. |
| 9,502,894 B2 | 11/2016 | Holmberg et al. |
| 9,634,491 B2 | 4/2017 | Robinson et al. |
| 9,698,596 B2 | 7/2017 | Sauer et al. |
| 9,722,435 B2 | 8/2017 | Park |
| 2002/0135492 A1 | 9/2002 | Reagan et al. |
| 2003/0006905 A1 | 1/2003 | Shieh et al. |
| 2003/0054215 A1 | 3/2003 | Doshi et al. |
| 2003/0234729 A1 | 12/2003 | Shen |
| 2004/0061380 A1 | 4/2004 | Hann et al. |
| 2004/0125618 A1 | 7/2004 | De Rooij et al. |
| 2005/0037241 A1 | 2/2005 | Schneider et al. |
| 2005/0275372 A1 | 12/2005 | Crowell |
| 2006/0127725 A9 | 6/2006 | Sarkar et al. |
| 2007/0078230 A1 | 4/2007 | Lai |
| 2007/0141424 A1 | 6/2007 | Armstrong et al. |
| 2007/0222301 A1 | 9/2007 | Fadell et al. |
| 2008/0024007 A1 | 1/2008 | Budampati et al. |
| 2008/0269953 A1 | 10/2008 | Steels et al. |
| 2008/0305839 A1 | 12/2008 | Karaoguz et al. |
| 2009/0079263 A1 | 3/2009 | Crumm et al. |
| 2010/0001689 A1 | 1/2010 | Hultman et al. |
| 2010/0280676 A1 | 11/2010 | Pabon et al. |
| 2011/0006603 A1 | 1/2011 | Robinson et al. |
| 2011/0007491 A1* | 1/2011 | Robinson ............ H02J 7/02 361/810 |
| 2011/0184585 A1 | 7/2011 | Matsuda et al. |
| 2011/0278957 A1 | 11/2011 | Eckhoff et al. |
| 2012/0205976 A1 | 8/2012 | Shih et al. |
| 2014/0091623 A1 | 4/2014 | Shippy et al. |
| 2014/0095915 A1 | 4/2014 | Long et al. |
| 2014/0097685 A1* | 4/2014 | Jun ........................ H02J 1/04 307/31 |
| 2014/0292081 A1 | 10/2014 | Long et al. |
| 2015/0137606 A1 | 5/2015 | Adest et al. |
| 2016/0094071 A1 | 3/2016 | Nge et al. |
| 2016/0329811 A1 | 11/2016 | Du et al. |
| 2017/0338665 A1 | 11/2017 | Long et al. |

FOREIGN PATENT DOCUMENTS

| | | |
|---|---|---|
| WO | 2007/012785 | 2/2007 |
| WO | 2007/048837 | 5/2007 |
| WO | 2007/076440 | 7/2007 |
| WO | 2008/072014 | 6/2008 |
| WO | 2008/072015 | 6/2008 |
| WO | 2008/090378 | 7/2008 |
| WO | 2011/023678 | 3/2011 |
| WO | 2011/046645 | 4/2011 |
| WO | 2011113280 | 9/2011 |
| WO | 2012/122315 | 9/2012 |
| WO | 2013/083296 | 6/2013 |
| WO | 2014/165469 | 10/2014 |
| WO | 2017/087130 | 5/2017 |

OTHER PUBLICATIONS

European Search Report for European Patent Application No. 16866830.9 dated Mar. 1, 2019, 9 pages.
Alibaba.com, 5KW charger controller for wind power supply and solar cell, 2009, 3 pages.
Amazon.com: Morningstar TriStar-45 Solar Charge Controller for solar/wind generator/Wind Turbine-45 amps, 2009, 6 pages.
Bruce et al.,www.rfdesign.com, Defense Electronics, Military takes aim at high battery costs, Apr. 2005, pp. 20-25.
F.H. Khan et al., ww.ietdl.org, IET Power Electronics, Bi-directional power manager management and fault tolerant feature in a -5kW multivlevel dc-dc converter with modular architecture, 2009, pp. 595-604, vol. 2, No. 5, 10 pages.
Fran Hoffart, New charger topology maximizes battery charging speed, 1998, 2 pages.
Green Plug, www.greenplug.us, One plug one planet, 2009, 7 pages.
greentmcnet.com/topics/green/articles/57729-green-plug-partners-with-wipower-advanced-wireless-power.htm, Gren plug partners with wipower for advanced wireless power systems, 2009, 3 pages.
Greg Cipriano et al., Protonex, Joint Service Power Expo, 2009, 38 pages.
http://defense-update.com/products/b/ba5590.htm, BA 5590 Lithium Battery, Jul. 26, 2006, 1 page.
http://fuelcellsworks.com/news/2009/06/04/sfc-smart-fuel-cell-launches-joint-power-manager, SFC smart fuel cell launches joint power manager, Jun. 2009, 4 pages.
Ian C. Evans et al., IEEE electric ship technologies symposium, High power clean dc bus generation using ac-link ac to dc power voltage conversion, dc regulation, and galvanic isolation, 2009, 12 pages.
Inki Hong et al., IEEE Transactions on computer-aided design of integrated circuits and systems, Power Optimization of variable-voltage core-based systems, Dec. 1999, vol. 18, No. 12, 13 pages.
Jaber A. Abu et al., Twenty-Fourth Annual IEEE Applied Power Electronics Conference and Exposition, Control Scheme for high-efficiency high-performance two-stage power converters, 2009, 7 pages.
Jorge L. Duarte et al., IEEE Transactions on Power Electronics, Three-Port Bidirectional converter for hybrid fuel cell systems, 2007, vol. 22, No. 2, 8 pages.
Julio Garcia, 2009 Barcelona Forum on Ph.D. Reseach in Electronic Engineering, Efficiency improvements in autonomous electric vehicles using dynamic commutation of energy resources, 2009, 2 pages.
Karlsson et al., IEEE Transactions on power electronics, DC bus voltage control for a distributed power system, Nov. 2003, pp. 1405-1412, v: 18, n:6, 8 pages.
Leonid Fursin et al., Development of compact variable-voltage, bi-directional 100kw dc-dc converter, 2007, 9 pages.
M. Becherif et al., Vehicle power and propulsion conference (VPPC), 2010 IEEE, IEEE Power and Propulsion Conference (VPPC), Advantages of variable DC bus voltage for hybrid electrical vehicle, 201. pp. 1-6.
M. Conti et al., SystemC modeling of a dynamic power management architecture, 6 pages.
Mat Dirjish, http://electronicdesign.com/Articles/Index.cfm?AD=1&ArticlesID-19515; Enginner seeks cure for common wall warts, Aug. 2008, 3 pages.
Matthew Alan Merkle, Thesis submitted to the faculty of Virginia Polytechnic Institute and State UniversityVariable bus voltage modeling for series hybrid electric vehicle simulation, Dec. 1997, 33 pages.
Ocean Server Technology, Inc., Intelligent Battery and Power System, May 2008, 4 pages.
Ocean Server Technology, Inc., Smart Li-ion packs, integrated chargers, ultra high efficiency dc-dc converters, integrate battery power or backup, fully engineered (plug and run) and 95 to 25,000+ watt-hour clusters, 2007, 4 pages.
Peter Podesser, www.mil-embedded.com/articles/id/?3966, Portable power management for soldiers; Fuel cell hybrid system is lighter, safer, May 2009.
replay.waybackmachine.org/20090122152343/http://ww.sfc.com/en/about-sfc.html, About SFC Small Fuel Cell, 1 page.
replay.waybackmachine.org/20090312005238/http://ww.sfc.com/en/man-portable-technology-power-manager.html, The SFC Power Manager—The Technology, 2009, 2 pages.
Reyneri et al., IAC-09.C3.2.8, A redundant power bus for distributed power management for a modular satellite, 2009, 8 pages.
Richter Wolfgang, Chip for saving power, Aug. 2007, 2 pages.

(56) References Cited

OTHER PUBLICATIONS

Robert M. Button, Nasa/TM-2002-211370, Intelligent Systems for Power Management and Distribution, Feb. 2002, 12 pages.
Singh et al., Conference Record of the Twenty-Eighth IEEE Photovoltaic Specialists Conference, Fuzzy Logic-based Solar Charge Controller for Microbatteries, 2000, pp. 172-1729.
Wilson Rothman, gizmodo.com/295076/new-Honeywell-hdmi-cable-heals-self-but-at-what-cost, New Honeywell Cables HDMI Cables Heals Self, But At What Cost?, Aug. 2007, 3 pages.
ww.sfc.com/index2.php option=com_pressreleasees&Itemid=467 &id=1050&lang=en&pop-1&page=0, SFC receives commercial order for portable fuel cells, 2008 1 page.
www.energyharvestingjournal.com/articles/soldier-worn-portable-power-management-system-00001375.asp?sessionid=1, Energy Harvesting Journal: Soldier-worn portable power management system, 2009, 2 pages.
www.mpoweruk.com/bms.htm,Battery Management Systems (BMS), 2009, 12 pages.
www.nkusa.com/prod-monitor-smart-cable.htm, Nihon Kohden: Products-Monitoring, Smart Cable Technology, 1 page.
www.parteltronics.com/ip.asp?op=Multiplex%20Distributions% 20Systems, Paneltronics, What is Power Sign?, 2006, 2 pages.
www.reuters.com/article/pressRelease/idUS159777+17-Feb-2009+ BW20090217, Reuters, Protonex to Launch Soldier-Worn Portable Power Management Systems, Feb. 2009, 3 pages.
www.sfc.com, About SFC Smart Fuel Cell, 2009, 1 page.
International Search Report and Written Opinion for International Application No. PCT/US2016/058922, dated Feb. 9, 2017, 6 pages.
International Search Report and Written Opinion for International Application PCT/US2016/062863 dated Mar. 30, 2017, 6 pages.

\* cited by examiner

POWER MANAGER WITH RECONFIGURABLE POWER CONVERTING CIRCUITS

CROSS REFERENCE TO RELATED APPLICATIONS

This application claims the benefit of and is a U.S. national phase, pursuant to 35 U.S.C. § 371, of International Patent Application No. PCT/US2016/058922, filed Oct. 26, 2016, which claimed the benefit of U.S. Provisional Application No. 62/257,995, filed Nov. 20, 2015. The entire contents of the above applications are incorporated herein in their entireties by this reference.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© Protonex Technology Corp.

3 BACKGROUND OF THE INVENTION

3.1 Field of the Invention

The exemplary, illustrative, technology herein relates to a power manager that includes a plurality of device ports that can each be connected to a DC power bus over a different power channel. External DC power devices connected to device ports can be connected to the power bus over corresponding power channels by operating switches to connect a given device port to the power bus. At least one of the power channels is a reconfigurable converter power circuit that includes a unidirectional DC to DC power converter. The reconfigurable power circuit can be reconfigured for three different functions: input signal voltage conversion, output signal voltage conversion, and no voltage conversion.

3.2 The Related Art

Portable power manager devices are used to scavenge DC power from external power devices, i.e. DC power sources and energy storage devices such as rechargeable DC batteries. The scavenged power received from external DC power and energy sources is used to power a power bus operating on the portable power manager. External power devices that need power, i.e. DC power loads and or energy storage devices such as rechargeable DC batteries are interfaced to the power bus to draw power from the power bus.

Conventional power managers include a plurality of device ports connected to an internal DC power bus. An external DC power device is connected to a device port. Typically each device port includes a direct connect power channel usable to directly connect an external power device connected to a device port to the power bus without voltage conversion. In conventional power managers direct connect power channels include a switch, operable by a digital processor operating on the power manager, to directly connect an external DC power device to the power bus or to disconnect the external power device from the power bus.

Conventional portable power manager devices use a fixed bus voltage selected to match the operating voltage of most of the external DC power devices that will be powered by or recharged by the power manger. Thus when the power manager is expected to be used to power 12 VDC devices its bus voltage operating range might be set at 12 to 15 VDC. Thus whenever an external DC power device has an operating voltage that is matched to the bus voltage, that external power device can be connected to the DC power bus over the direct connect power channel as long as other criteria favor the connection. Thus each device port includes a direct connect power channel which is bidirectional and can be used to receive input power from an external power device or to deliver output power to an external power device as long as the external power device is compatible with the bus voltage.

In conventional portable power managers each device port also may be associated with a power converting power channel that includes either an input DC to DC power converter or an output DC to DC power converter and at least one switch operable by the digital processor operating on the power manager to connect an external DC power device to the power bus over the power converter channel or to disconnect the external DC power device from the power bus or to prevent the connection as needed. In cases where an external DC power device is a non-bus compatible DC power or energy source usable to scavenge input power; the external device is connected to the power bus over a power converting channel that includes an input power converter. In cases where an external DC power device is a non-bus compatible DC power load or rechargeable energy storage device that needs to be powered, the external device is connected to the power bus over an output power DC to DC converter.

Examples of conventional portable power managers are disclosed in U.S. Pat. No. 8,775,846, entitled Portable Power Manager; U.S. Pat. No. 8,638,011, entitled Portable Power Manager Operating Methods; and U.S. Pat. No. 8,633,619, entitled Power Managers and Methods for Operating Power Managers all to Robinson et al. describing portable power manager devices and operating methods. In these examples the power manager devices include six device ports that can each be connected to a power bus or disconnected from the power bus by operating switches under the control or a digital process or CPU. The power bus operates at a fixed bus voltage which can vary slightly over a range. All six device ports include a direct connect bidirectional power channel that extends from the power bus to the device port. Each direct connect power channel includes a switch operable by the digital processor. Thus any one of the six device ports can be connected to the power bus over a direct connect power channel when an external power device connected to the device port is a bus voltage compatible device and this includes any DC power source, DC power load, or rechargeable battery that can be operated at the bus compatible voltage.

The device disclosed by Robinson et al. includes a total of three DC to DC power converters with one power converter arranged as an input power converter and two power converters arranged as output power converters. More specifically the input power converter is shared by two input ports and each of the two output power converters is shared by two output ports. One problem with this configuration is that while there are six device ports only three of the six device ports can use one of the three DC to DC power converters at the same time. More specifically only one input device port can be connected to the power bus over an input power converting channel and only two output device ports can be connected to the power bus over an output power converting channel at the same time. In practice this can result in situations where only three device ports or at least less than all six device ports can be utilized.

This problem can be solved by providing an input power converting channel and an output power converting channel between each device port and the power bus; however, such a device is more costly and increases the weight and device package size. Meanwhile there is a need in the art to decrease the cost weight and package size of conventional portable power managers.

Another problem with conventional portable power managers that use a fixed bus voltage is that the fixed power manager bus voltage tends to limit the type of external DC power devices that it can be used with. Specifically a portable power manager having a fixed 12 VDC bus voltage is best suited to scavenge power for external power devices that operate at 12 VDC. However, for the reasons stated above, the same conventional portable power manager is not as effective in an environment where most external power devices that need to be powered by the power bus operate at 48 VDC. Thus there is a need in the art to provide a power manager that can operate at different bus voltages depending in part on the operating voltage of external DC power devices that need to be connected to the power bus.

4 SUMMARY OF THE INVENTION

The problems with conventional power managers described above are overcome by the present invention which includes a novel power manger configuration and operating methods.

The power manger configuration includes a DC power bus, a digital data processor, a memory device in communication with the digital data processor and energy management schema operating on the digital data processor. A single primary device port can be connected to the DC power bus over a primary power channel. The primary power channel extends between the primary device port and the DC power bus and includes a primary switch operable by the digital data processor disposed along the primary power channel.

The power manager includes at least one and preferably two converter device ports. Each converter device port includes a reconfigurable power channel that extends between the converter device port and the DC power bus and includes a one-way DC to DC power converter having an input terminal and an output terminal and a plurality of secondary switches operable by the digital data processor disposed along the converter power channel. The reconfigurable power channel can be reconfigured into one of three different power channel configurations by selectively opening and closing different ones of the plurality of secondary switches.

In one configuration (234) an external DC power device connected to a converter device port is connected to the power bus with by closing secondary switches (253) and (255) and opening secondary switches (257) and (259).

In another configuration (232) an external DC power device connected to a converter device port is connected to the input terminal of the one-way DC to DC power converter and the output terminal of the one-way DC to DC power converter is connected to the power bus by closing secondary switches (255) and (257) and opening secondary switches (253) and (259).

In another configuration (230) an external DC power device connected to a converter device port is connected to the output terminal of the one-way DC to DC power converter and the input terminal of the one-way DC to DC power converter is connected to the power bus by closing secondary switches (253) and (259) and opening secondary switches (255) and (257).

A method for operating a power manager includes polling by the digital data processor over a communication network all of the device ports to determine, for each external DC power device connected to a device port, a device type and an operating voltage and other power characteristics of each external DC power device. An energy management schema operating on the digital data processor uses the power characteristics of each external DC power device to determine the instantaneous input power available from all of the external DC power devices electrically interfaced to a device port and the instantaneous power load being demanded by all of the external DC power devices electrically interfaced to a device port.

The energy management schema then sets an operating voltage of the DC power bus to match an operating voltage of the primary external DC power device so that the primary power device can be connected to the power bus without requiring any power or voltage conversion by a DC to DC power converter. The energy management schema then determines a connection scheme for connecting external DC power devices interfaced with different device ports to the DC power bus. Once the connection scheme is determined, the primary power device is connecting to the DC power bus by operating the closing the primary switch (261) and by reconfiguring the reconfigurable power channel as needed to connect each secondary power device to the DC power bus by operating corresponding secondary switches and setting operating points for the one-way DC to DC power converters.

These and other aspects and advantages will become apparent when the Description below is read in conjunction with the accompanying Drawings.

5 BRIEF DESCRIPTION OF THE DRAWINGS

The features of the present invention will best be understood from a detailed description of the invention and example embodiments thereof selected for the purposes of illustration and shown in the accompanying drawings in which.

6 DESCRIPTION OF SOME EMBODIMENTS OF THE INVENTION

6.1 Definitions

The following definitions are used throughout, unless specifically indicated otherwise:

| TERM | DEFINITION |
| --- | --- |
| External Power Device | A DC power load, a DC power source, or a re-chargeable DC battery. |
| Energy Management Schema | An energy management schema includes various programs, firmware algorithms, and policy elements operating on a digital data processor to receive input power into a power manager from one or more device ports and to distribute output to external power devices connected to one or more device ports. |

6.2 Item Number List

The following item numbers are used throughout, unless specifically indicated otherwise.

| # | DESCRIPTION |
| --- | --- |
| 100 | Power manager |
| 110 | DC power bus |
| 112 | Power bus power sensor module |
| 114 | Network communication interface device |
| 116 | Internal battery |
| 120 | Digital data processor |
| 122 | Memory module |
| 130 | Communication channel |
| 141 | First converter device port |
| 142 | Second converter device port |
| 143 | Primary device port |
| 151 | First reconfigurable converter power circuit |
| 152 | Second reconfigurable converter power circuit |
| 153 | Primary power channel |
| 161 | Secondary external DC power device |
| 162 | Secondary external DC power device |
| 163 | Primary external DC power device |
| 170 | Power manger enclosure |
| 172 | Enclosure side wall |
| 174 | Enclosure top wall |
| 176 | Physical connector |
| 177 | Physical connector |
| 178 | Physical connector |
| 180 | Shielded cable |
| 181 | Distal end of cable |
| 183 | Proximal end of cable |
| 184 | Cable gland |
| 186 | Cable conductive elements |
| 200 | Power manager enclosure |
| 210 | Converter circuit power sensor module |
| 211 | Converter circuit power sensor module |

-continued

| # | DESCRIPTION |
| --- | --- |
| 212 | Primary channel power sensing module |
| 220, 221 | One-way DC to DC power converter |
| 222 | Power converter input terminal |
| 224 | Power converter output terminal |
| 230 | Power converting output power channel |
| 231 | Power converting output conductive pathway |
| 232 | Power converting input power channel |
| 233 | Power converting input conductive pathway |
| 234 | Bus compatible power channel |
| 235 | Bus compatible conductive pathway |
| 243 | Converter channel leg |
| 245 | Converter channel leg |
| 247 | Converter channel leg |
| 249 | Converter channel leg |
| 251 | Primary leg |
| 253 | First configurable switch 312 |
| 255 | Second configurable switch 311 |
| 257 | Third configurable switch 314 |
| 259 | Fourth configurable switch 313 |
| 261 | Primary configurable switch |
| 300 | Wire assembly |

6.3 Exemplary System Architecture

Figure 1:
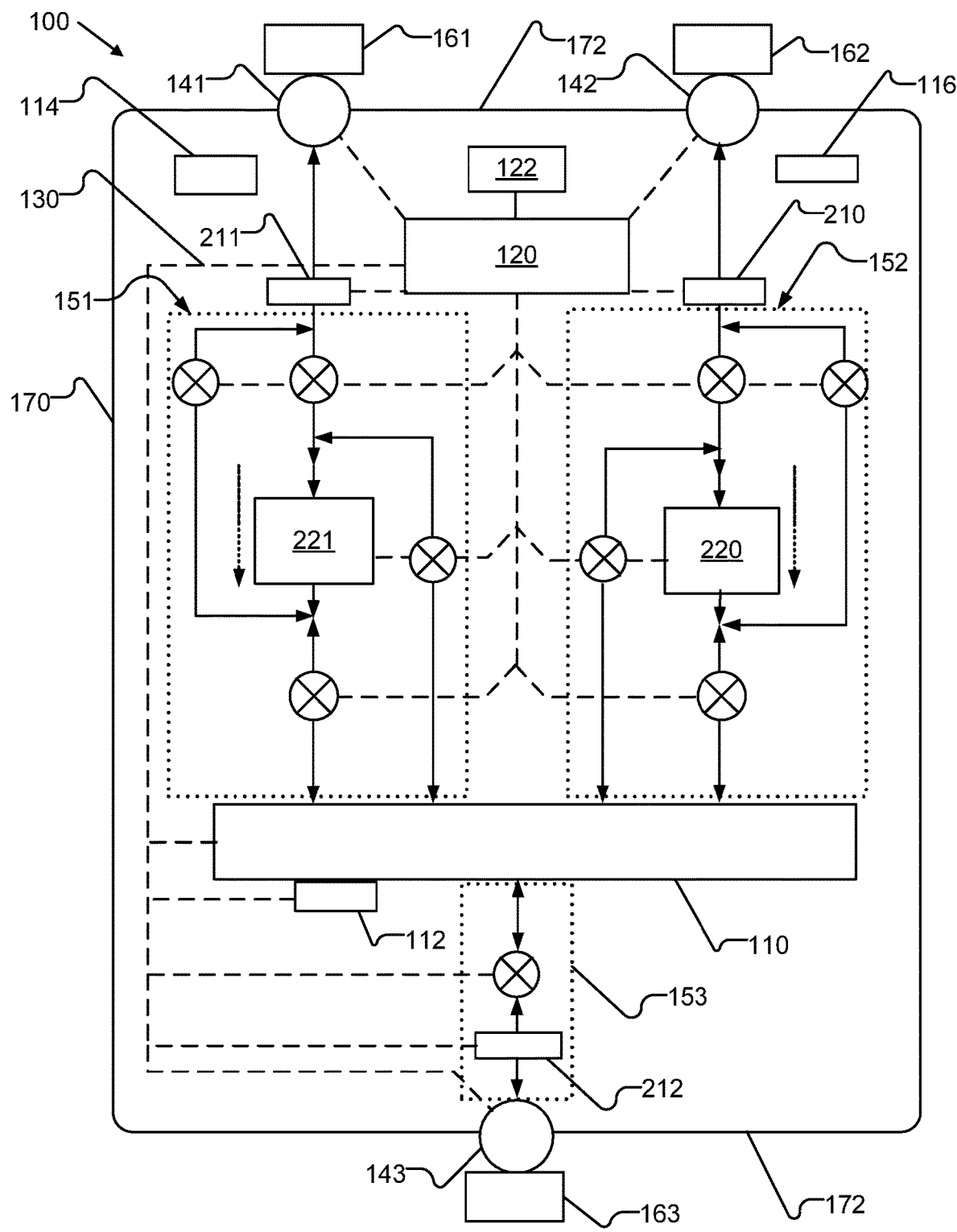
FIG. 1 depicts an exemplary schematic diagram of a non-limiting exemplary power manager according to one aspect of the present invention.

Referring to FIG. 1, an exemplary, non-limiting power manager (100) according to the present invention is shown in schematic view. The power manager (100) includes a digital data processor (120) and an associated memory module (122). The digital data processor (120) includes a programmable logic device operating an energy management schema program and carrying out logical operations such as communicating with external DC power devices (161, 162, 163), connected to device ports (141, 142, 143), managing the memory module (122) to store and recall data, reading sensor signals from power sensors, altering an operating voltage of a DC power bus (110), and operating one or more reconfigurable power circuits and related power channel control devices to establish a power network operable to exchange power from one external DC power device to another.

6.3.1 Variable Voltage DC Power Bus

Power manager (100) includes a variable voltage DC power bus (110). An operating voltage of the DC power bus (110) can be set by the digital data processor (120). In an example operating mode, the operating voltage of the DC power bus (110) is matched to an operating voltage of an external DC power device (163) interfaced with a primary device port (143). The primary device port (143) is connected to the power bus (110) over a primary power channel that does not include a power converter. Accordingly the operating voltage of the primary external DC power device (163) is always used to establish the operating voltage of the DC power bus (110).

Power manager (100) includes a bus power sensor module (112) in electrical communication with DC power bus (110) and in communication digital data processor (120) and operable to measure and report instantaneous DC voltage at the DC power bus (110) to the digital data processor (120).

Bus power sensor module (112) may determine one or more of instantaneous power, instantaneous voltage, and/or instantaneous current amplitude at the DC power bus (110).

6.3.2 Device Ports

The power manager (100) described below includes three device ports; however, any practical implementation that includes two or more device ports is within the scope of the present invention. In each embodiment, the power manager includes a single primary device port (143) and one or more secondary device ports (141, 142). Each device port provides a wired electrical interface over which an external DC power device (161, 162, and 163) can be electrically interfaced to the power manager by a wire connection that at least includes a power channel. Each device port (141, 142, 143) also includes a communication channel or interface such as SMBus or the like operable to provide a digital communication link between the digital data processor (120), and an external DC power device electrically interfaced with each device port. Each device port (141, 142, and 143) includes a power channel operable to exchange a power signal between the DC power bus (110) and an external DC power device electrically interfaced to the device port. The communication channel can be a wired communication channel or a wireless communication channel. Also the power channel may include an inductive portion for power exchange from the device port to an external DC power device across a none-wire medium.

6.3.3 Cable Gland

Figure 2:
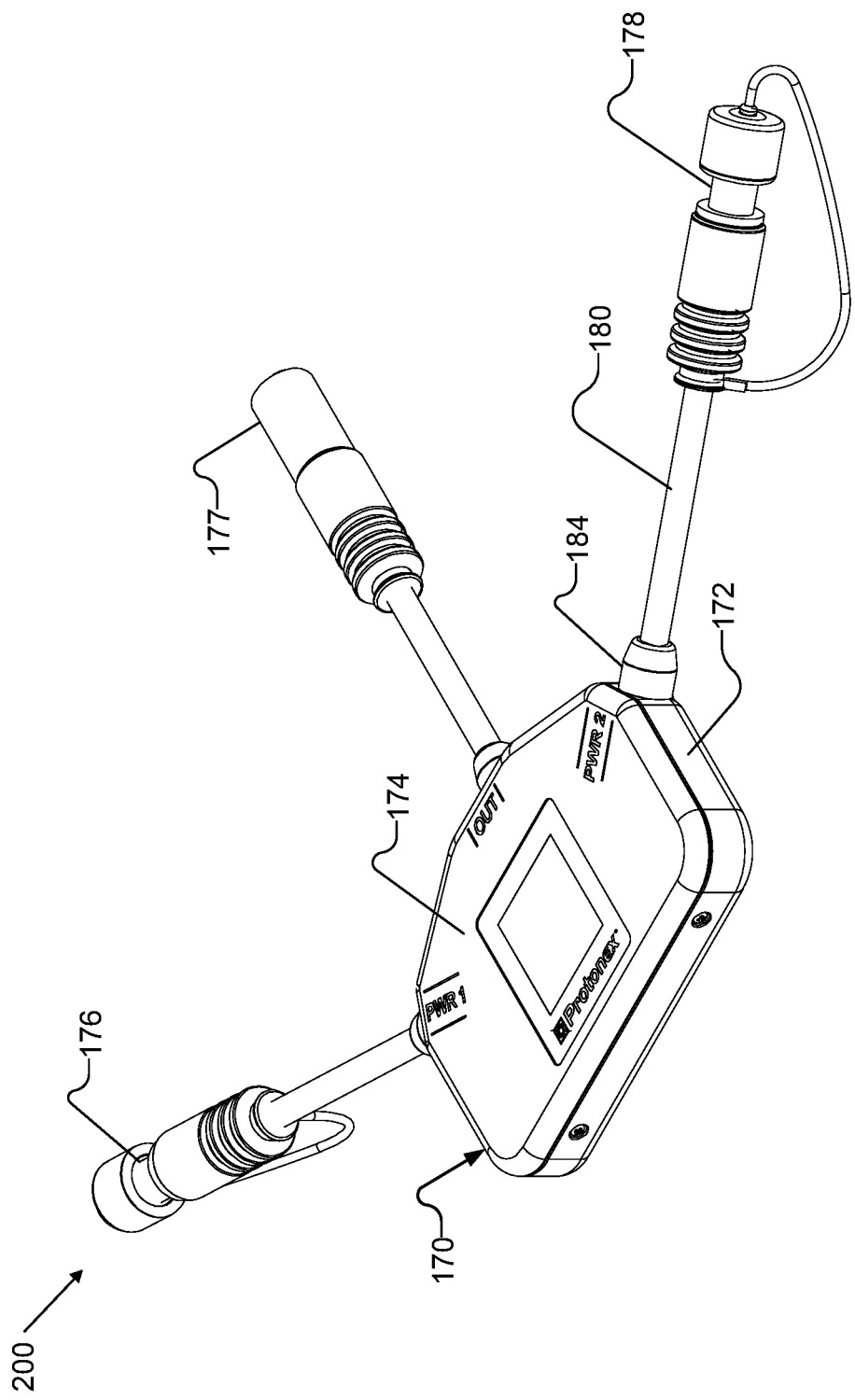
FIG. 2 depicts a perspective view of a non-limiting exemplary power manager according to one aspect of the present invention.
Figure 3:
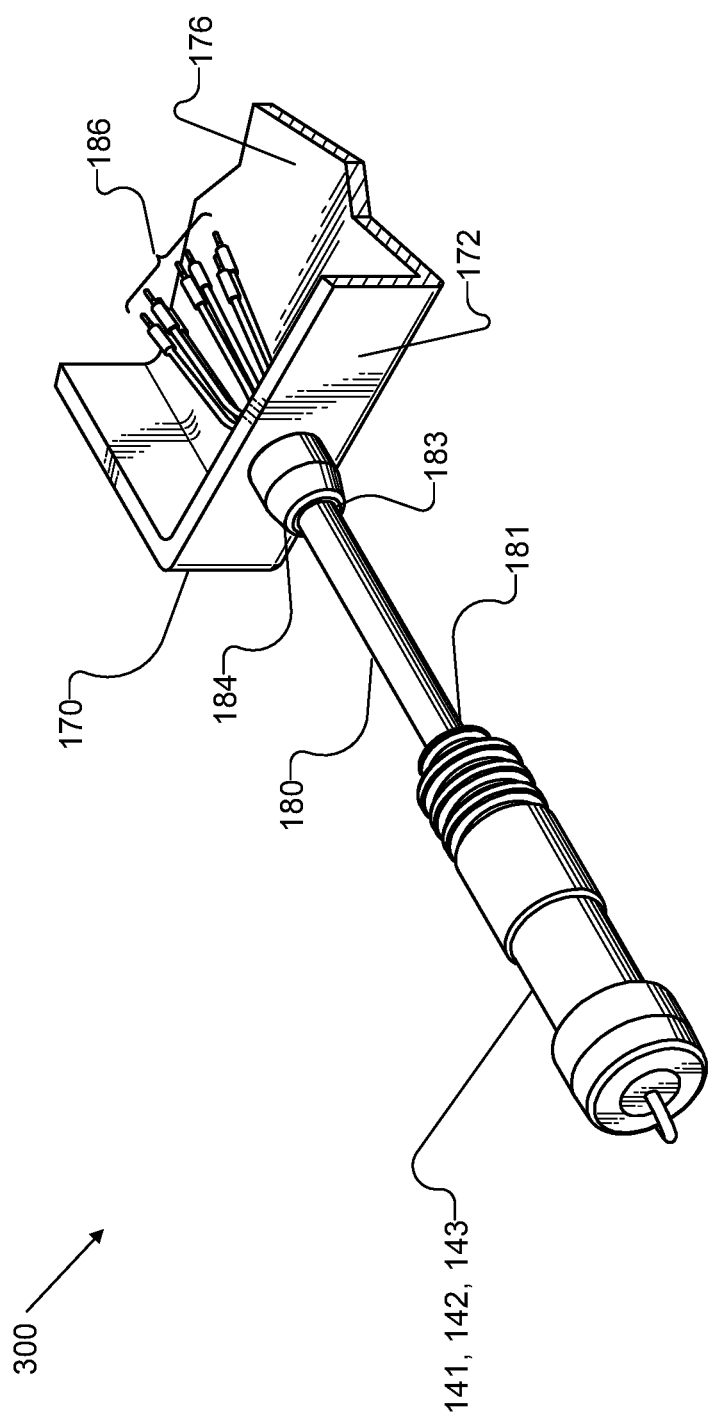
FIG. 3 depicts a perspective view of a non-limiting exemplary cable assembly according to one aspect of the present invention.

Referring to FIGS. 1-3 in an exemplary, non-limiting, embodiment power manager (200) includes a sealed and substantially weather and dust tight power manager device enclosure (170) including a plurality of enclosure side walls (172) an enclosure top wall (174) and an opposing enclosure bottom wall opposed to the top wall (174). The enclosure (170) encloses components of the power manager (100) including the digital data processor (120), the DC power bus (110), and the power circuits and channels (151, 152, and 153). In a non-limiting embodiment, the device ports (141, 142, and 143) are connected to distal ends (181) of wire cables (180) that pass through the enclosure side walls (172) at a proximal end.

In a preferred embodiment each device port comprises a first physical connector or plug (176, 177, and 178) suitable for connecting to an external power device connected to the distal end (181) of wire or cable (180). Each first physical connector or plug is suitable for mating with any external DC power device having a comparable second physical connector or plug. In a preferred embodiment external DC power devices are easily connected to or disconnected from any one of the first physical connectors to electrically interface with the power manager.

Referring to FIG. 3 which depicts a wire assembly (300), each device port includes a cable gland (184) passing through one of the enclosure side walls (172). The wire cables (180) each preferably comprise a shielded cable wherein a proximal end (183) of each wire cable passes through a different cable gland (184) and a distal end (181) of each the wire cables is terminated by a first physical connector (176, 177, and 178). Each cable gland (184) passes through an aperture passing through an enclosure side wall (172) and is attached to and mechanically supported by the enclosure side wall (172). Each wire cable (180) includes conductive elements (186) enclosed by a cable shielding layer which is further enclosed by an electrically insulating cable outer covering. Some of the conductive elements (186) at the proximate end of each wire cable are electrically interfaced with one of the power channels (151, 152, and 153) which provide a conductive path to the DC power bus (110). Some of the conductive elements (186) at the proximal end of each wire cable may be electrically interfaced with one of the communication channels (130). The conductive elements (186) at the distal end (181) of each wire cable are electrically interfaced with a different first physical connector (141, 142, and 143) which includes one or more power channels and may include one or more wired communication channels. Each cable (180) enters the cable gland (183) from outside the enclosure side wall (172) and the cable shielding layer and the electrically insulating cable outer covering the shielding layer are gripped by the cable gland (184) in a manner that electrically grounds the cable shielding layer to a corresponding enclosure sidewall (172) and secures the distal end to the cable gland. A similar cable gland (184), cable and enclosure wall interface is disclosed in commonly owned U.S. patent application Ser. No. 15/081,461 entitled Cable Gland Assembly by Long et al. filed on Mar. 25, 2016, which is hereby incorporated herein in its entirety for all purposes.

6.3.4 Communication Network

Referring now to FIG. 1 the power manager (100) includes a communication network (130). The communication network (130) includes one or more network or similar communication interface devices (114) and a plurality of communication channels interconnecting various internal devices and modules to the digital data processor (120) for digital communication. The communication network (130) optionally includes additional network communication interface devices (114) operable to communicate with other power managers, e.g. over a peer-to-peer network, as well as to gain access to a Wide Area Network (WAN), e.g. over a cellular network interface device, and or to communicate with WAN based devices such a policy server, authentication module or the like, operating on one or more WAN based servers. Each wireless network interface device (114) is configured to receive communication signals configured in a first communication protocol structure and to translate the first communication protocol signals to a second communication protocol structure as needed to facilitate communication between devices configured to use different communication protocols. The communication channels also may extend between internal modules of the power manager (100) without passing over the digital data processor (120) and may include analog channels for exchanging analog signals including power signals. Each device port (141, 142, and 143) is connected with the digital data processor (120) over at least one communication network channel. Accordingly when an external power device is connected with any one of the device ports the external DC power device joins the communication network established by the communication interface device (114) for communication with the digital data processor (120).

The communication network (130) optionally includes a variety of communication channel types, e.g. using different network protocols, suitable for digital data communications. The communication channel types may include analog signal conductors or the like for exchanging analog signals between electronic modules operating on the power manager (100). The communication network (130) is primarily a wired communication network housed inside the enclosure (170). Wireless communication channels are optionally provided such that in some embodiment's wireless communication channels are usable to communicate with external DC power devices or with other power managers and with network devices reachable on a Wide Area Network (WAN).

The various communication channel types may include one or more of a wired network using a wire network communication protocol, e.g. the IEEE 802.3 wired Local Area Networks (LAN) protocols which include Ethernet and Power over Ethernet (PoE), System Management Bus (SMBus), Universal Serial Bus (USB), Recommended Standard 232 (RS232), or the like. The various communication channel types may include wireless networks based on any one of the IEEE 802.11 Wireless Local Area Network (WLAN) protocols which include Wi-Fi, Bluetooth, or any one of the IEEE 802.11 WLAN protocols, and one or more cellular network protocols e.g. 3G, 4G, LTE, etc.

Additionally the communication network (130) may include conductive paths, wires or the like, for exchanging analog or digital signals between electronic components of the power manager such as various switches, sensors, and power converters and the digital data processor (120). In particular, the communication network (130) extends from the digital data processor (120) to each controllable element of the power manager (100) including switching elements (253, 255, 257, 259, 261), the DC power bus sensor (112), other power sensors (210, 211, and 212) and power converters (220, 221) to deliver control signals thereto and to receive sensor signals, or the like, therefrom. The control signals include configuration and setting instructions for operating each controllable element to receive and distribute power according to the energy management schema. The communication channels extending to device ports may comprise a one-wire identification interface configured to enable the digital data processor (120) to query a connected external power device (161, 162, and 163) for power characteristics information.

6.3.5 Power Manager Battery

The power manager (100) includes an optional internal rechargeable battery (116). If present, the internal battery (116) provides power to the digital data processor (120). The internal battery is a rechargeable battery (116) that can be charged when the power manager (100) is operably connected to a power source or external battery capable of providing charge. The internal battery (116) provides power to digital data processor (120), enabling the functioning of the power manager (100), when power sufficient for operation of the power manager is not available from a power source or rechargeable battery connected to a device port (161, 162, 163).

Alternatively, power sensors (210, 212) are operable to detect and operating voltage and or input power available from a connected external power source or rechargeable DC battery without any communication with the external device and to use the available input power to operate the digital data processor (120) or recharge the internal battery (116).

6.3.6 Primary Power Channel

Figure 4:
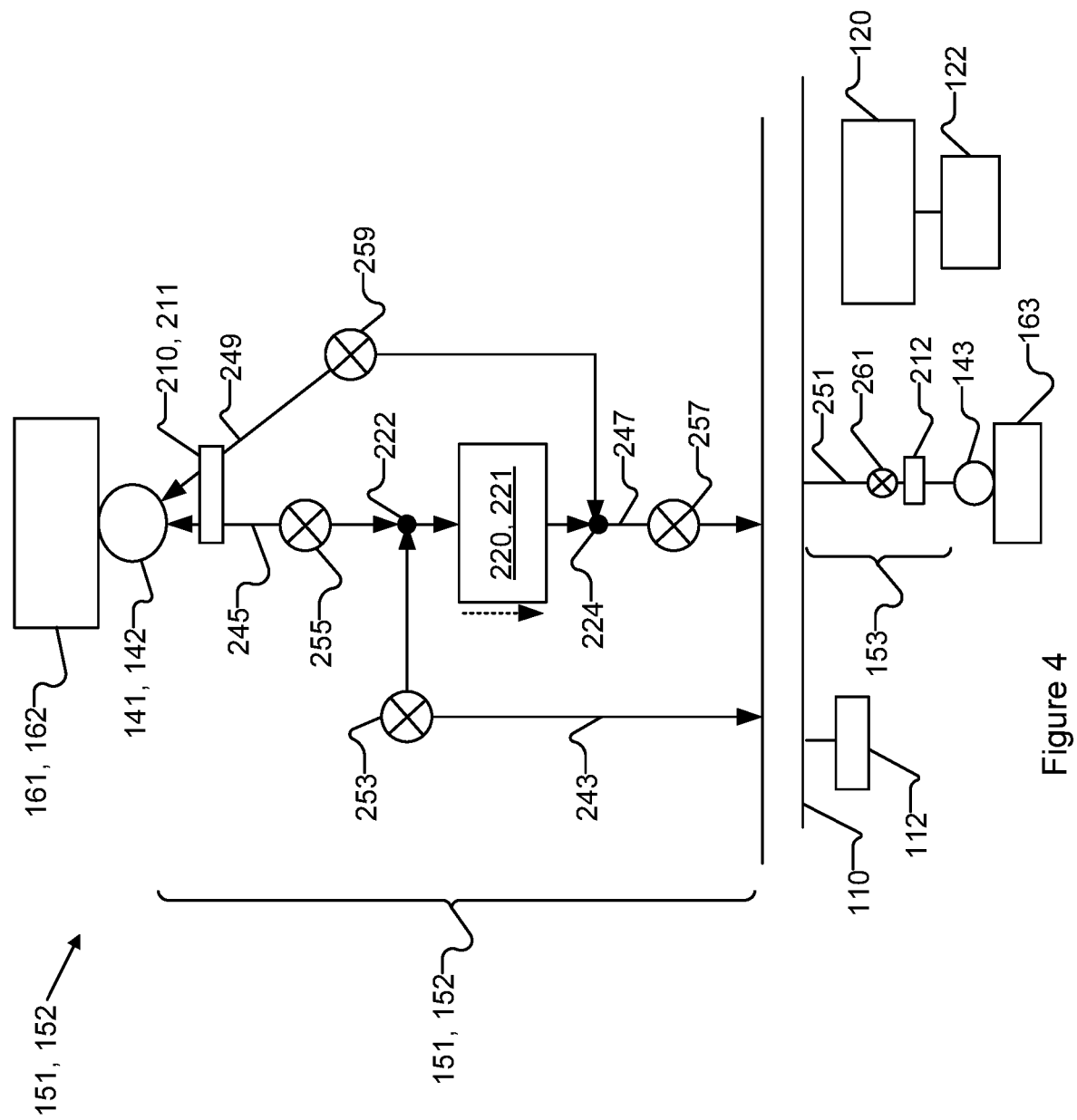
FIG. 4 depicts an exemplary schematic diagram of a non-limiting exemplary power manager according to one aspect of the present invention.

Referring now to FIGS. 1 and 4, power manager (100) includes a primary device port (143) which is electrically connectable to a primary external DC power device (163) and a DC power bus (110). The primary external DC power device (163) is any external DC power device that can be connected to any one of the primary device port (143) or the secondary device ports (141) or (142). The primary power channel (153) includes only one power channel extending from the primary device port (143) to the DC power bus (110) and is configurable a as bidirectional power channel operable as an input power channel or as an output power channel without voltage or power conversion and without current attenuation.

Primary power channel (153) includes a bidirectional conductor or primary leg (251) that extends between primary device port (143) and DC power bus (110) and allows current flow either from the primary external DC power device (163) to the DC power bus (110) or from the DC power bus (110) to the primary external DC power device (163). A primary configurable switch (261) is disposed along primary leg (251) between the primary device port (143) and DC power bus (110). Digital data processor (120) is in communication with primary configurable switch (261) over the communication network (130) and is operable to send control signals to the primary configurable switch (261). Digital data processor (120) can set primary configurable switch (261) in an open position to block flow of current over the primary leg (251) or in a closed position to allow an input power signal to pass from primary device port (143) to DC power bus (110) or to allow an output power signal to pass from power bus (110) to the primary external DC power device (163) over the primary device port (110), thereby connecting primary external DC power device (163) to DC power bus (110).

Primary power channel (153) optionally includes a primary channel power sensor module (212) associated with primary device port (143) and in communication with digital data processor (120) over the communication network (130). The primary channel power sensor module (212) is configured to measure power characteristics of power signals passing over the primary power channel (153) including one or more of instantaneous power amplitude, instantaneous voltage amplitude, and instantaneous current amplitude and to report amplitude measurement results to digital data processor (120).

6.3.7 Reconfigurable Converter Power Circuit

Referring now to FIGS. 1 and 4-7 the power manager (100) further includes at least one and in the present embodiment two converter or secondary device ports (141, 142) each of which is electrically connectable to a secondary external DC power device (161, 162). Each secondary external DC power device (161, 162) is any external DC power device that can be connected to any one of the primary device port (143) or the secondary device ports (141) or (142). Each reconfigurable power circuit (151, 152) extends between a different converter or device port (141, 142) and the DC power bus (110). Each reconfigurable power circuit (151, 152) is independently operated by the digital data processor (120) as needed to transfer power between a connected secondary external DC power device (161, 162) and the DC power bus (110) or to transfer power from the DC power bus (110) to the connected secondary external DC power device (161, 162). Each converter device port (141, 142) includes a communication channel, operably connectable to an external secondary DC power device (161, 162) interfaced therewith. The communication channel is part of the communication network (130), which enables communications between the digital data processor (120) and each of the secondary external DC power device (161, 162) interfaced with a converter device port (141, 142).

The reconfigurable converter power circuits (151, 152) each include one or more secondary power channels or conductors that extends from a different converter or secondary device port (141, 142) to the DC power bus (110). Each secondary power channel includes a different unidirectional DC to DC power converter (220, 221) disposed between a corresponding device port and the DC power bus. Each reconfigurable converter power circuit (151, 152) includes power channel circuitry that is configurable to provide any one of a unidirectional power converting input power channel (232), shown in FIG. 6, a unidirectional power converting output power channel (230), shown in FIG. 5, and a bidirectional power channel (234), shown in FIG. 7 wherein the bidirectional power channel (234) is usable as an input power channel or an output power channel without voltage conversion.

Each reconfigurable converter power channel (151, 152) includes a different converter circuit power sensor module (210, 211). Each converter circuit power sensor module is disposed proximate to a corresponding converter device port (141, 142) in order to sense power characteristic of power signals either entering or exiting the converter device port (141, 142). Each converter circuit power sensor module is in communication with the digital data processor (120) and is operable to measure power characteristics of a bidirectional power signal including one or more of instantaneous power, instantaneous voltage, and instantaneous current and to report measurement results to the digital data processor (120).

Each controllable unidirectional DC to DC voltage or power converter (220, 221) includes an input terminal (222) and an output terminal (224). Each DC to DC power converter (220, 221) is unidirectional because a power signal can only be power converted or current modulated when the power signal is directed from the input terminal (222) to the output terminal (224). Specifically, a power signal entering through the input terminal (222) is power converted and or current modulated according to power conversion and amplitude modulation settings received from the digital data processor (120). The power converted output signal exiting output terminal (224) has one of a different voltage or a different current amplitude, or both and may have a different total power amplitude as compared to the input power signal.

The DC to DC power converter (220) can be configured to convert in input signal voltage to a different output signal voltage by either stepping the input voltage up or stepping the input voltage down as required to adjust the output signal voltage exiting from the output terminal (224) to a desired voltage amplitude. Optionally the DC to DC power converter is further configured to modulate the current amplitude of the input power signal as required to adjust the output signal current amplitude exiting from the output terminal (224) to a desired current amplitude. Generally the power converter operates to modulate current amplitude passing over the power converter between substantially zero and a maximum available current amplitude, i.e. the entire instantaneous current amplitude of the input signal is passed through the power converter without modulation.

In an exemplary operating mode, the digital data processor (120) determines if an external DC power device connected to a converter or secondary device port (161, 162) is a DC power source, a rechargeable DC battery, or a DC power load, either by communicating with the external DC power device to determine a device type and other information such as the operating voltage range, state of charge, or the like, or by determining an instantaneous voltage based on a sensor signal received from the converter circuit power sensor module (210). Once the device type and voltage requirements of the device are determined the energy management schema operating on the digital data processor makes a determination about whether to connect the external power device to the DC power bus or not and further makes a determination about how to configure the relevant reconfigurable circuit (151, 152) to make the connection.

Each reconfigurable converter power circuit (151, 152) includes four configurable switches (253), (255), (257), and (259). Each configurable switch is operable to direct a power signal over a desired conductive flow path or to prevent the power signal from flowing over the conductive flow path. Digital data processor (120) is in communication with each of the four configurable switches via the communication network (130) and is operable to send an independent control signal to each switch. Each configurable switch (253, 255, 257, and 259) can be toggled to an open (off) position, to prevent current flow across the switch or toggled to a closed (on) position to allow current flow across the switch. Similarly the configurable switch (261) used in the primary power channel (153) can be toggled to an open (off) position, to prevent current flow across the switch or toggled to a closed (on) position to allow current flow across the switch.

In an exemplary embodiment, configurable switches (253, 255, 257, and 259) of the reconfigurable power circuits (251, 253) and the configurable switch (261) of the primary power channel (153) are single pole single throw type switches. Alternatively, the switches can be implemented with multiple throws, multiple poles. The switches can include Field Effect Transistors (FETs), e.g. MOSFETs, Power FETs, e-MOSFETs, etc.

Referring to FIGS. 4-7, each reconfigurable converter power circuit (151, 152) includes multiple power channels (230, 232, and 234) each comprising multiple converter channel legs (243, 245, 247, and 249). As shown in the Figures, bidirectional current flow over each leg is indicated by solid double-headed arrows, e.g. as shown on the primary power channel (153) and unidirectional current flow over each leg is indicated by solid single headed arrows, e.g. as shown on converter power circuit (230). Converter device port (141, 142), DC power bus (110), switches (253, 255, 257, and 259) and one-way DC to DC power converter (220) are interconnected by the converter channel legs (243, 245, 247, and 249) to provide various current flow paths or circuit configurations as may be required to distribute power to or receive power from an external converter power device connected to a secondary device port.

Reconfigurable converter power circuits (151, 152) are configurable to transfer power signals between converter or secondary device ports (141, 142) and the DC power bus (110) in either direction i.e., from converter device port (141, 142) to DC power bus (110) or from DC power bus (110) to converter device port (141, 142) with or without power conversion by configuring the state of each of the configurable switches (253, 255, 257, and 259) in patterns of open and closed positions and by configuring the state of each DC to DC power converter (120) for power converting or non-power converting modes. Patterns of open and closed positions and of on and off configurations are set forth in Table 1.

Figure 5:
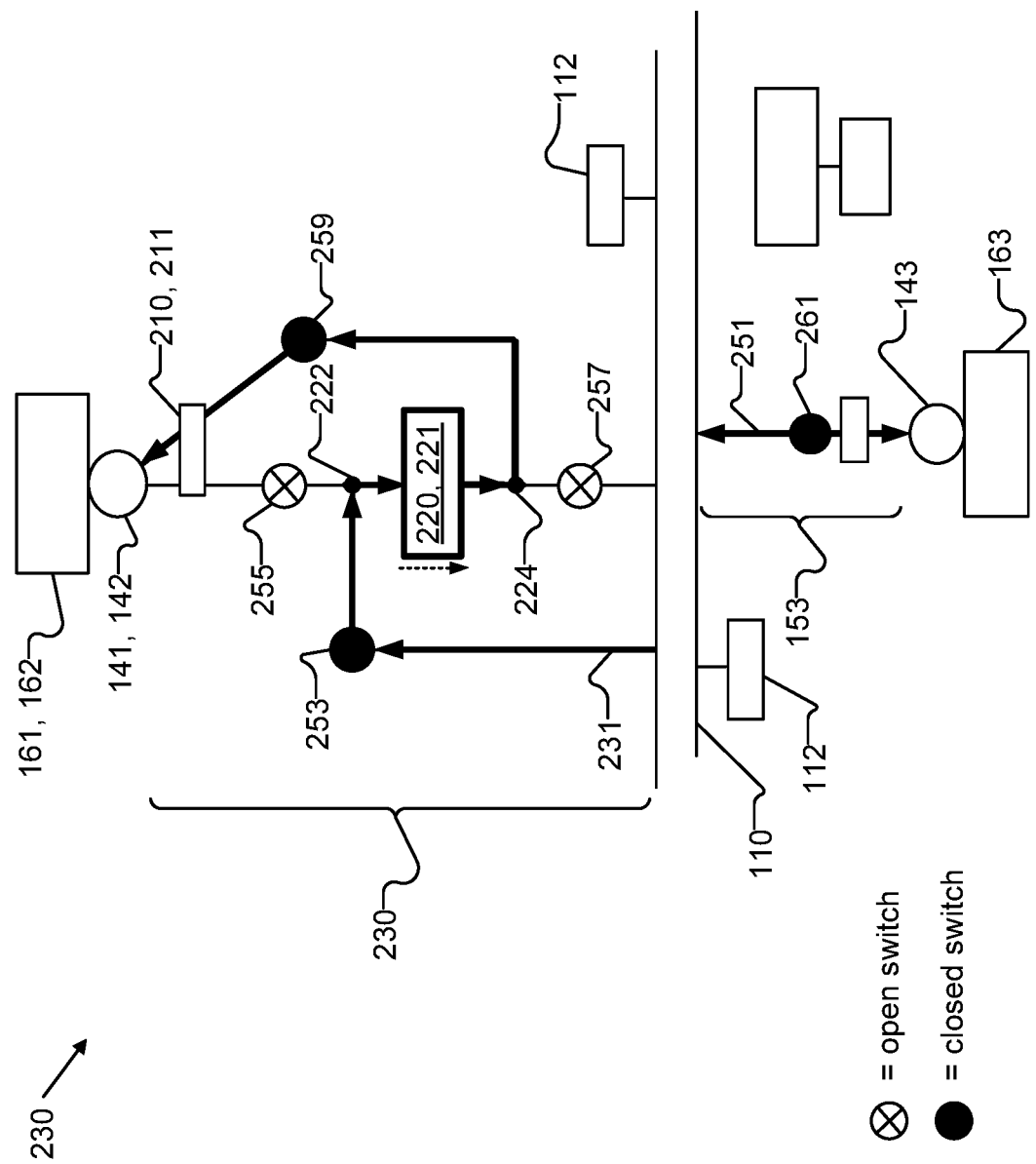
FIG. 5 depicts an exemplary schematic diagram of a non-limiting exemplary power manager according to one aspect of the present invention.
Figure 6:
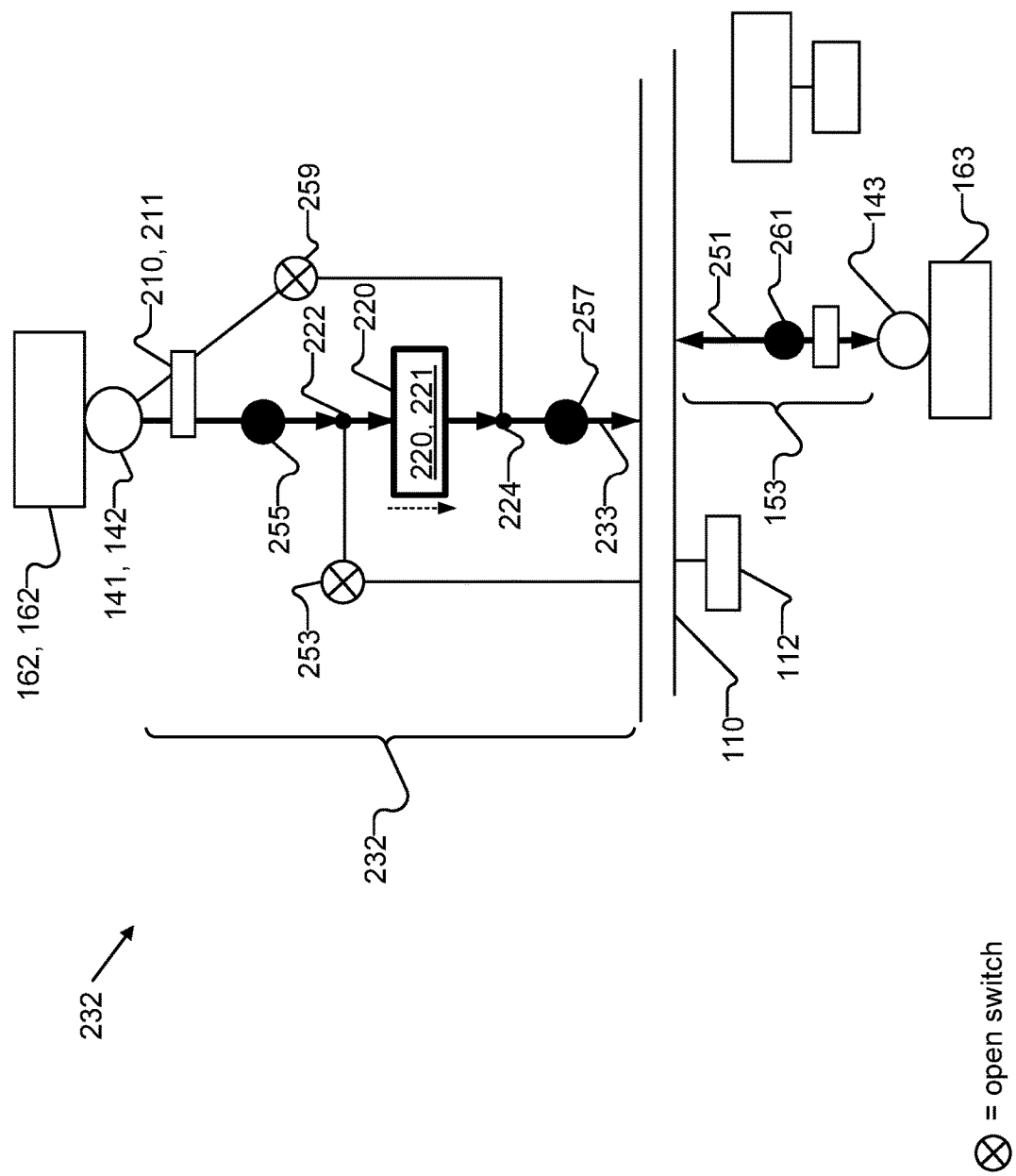
FIG. 6 depicts an exemplary schematic diagram of a non-limiting exemplary power manager according to one aspect of the present invention.
Figure 7:
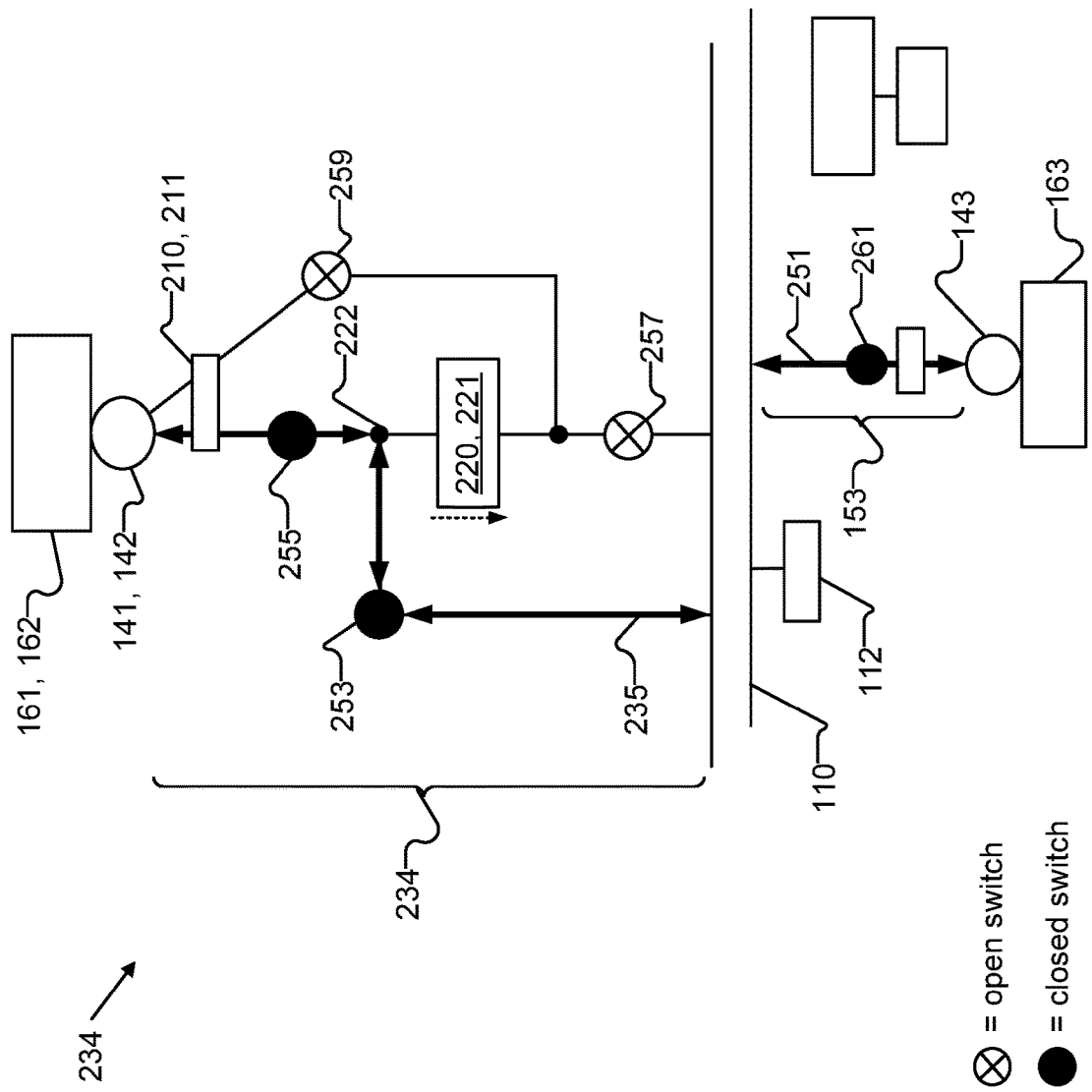
FIG. 7 depicts an exemplary schematic diagram of a non-limiting exemplary power manager according to one aspect of the present invention.

Referring to FIGS. 5, 6, and 7, patterns of configurable switch open and closed positions, power converter on and off configurations, and corresponding electrical current flow paths are shown for each of the multiple power channels (230, 232, and 234). Blackened circles represent closed switches, bolded power converter (220) outlines represent "on" state of the power converter, and bolded arrows represent active converter channel legs, i.e. channel legs over which electrical current can flow given the specified patterns of open and closed switch positions and power converter setting.

Primary power channel (153) is configured as an input/output power channel by closing primary configurable switch (261). In this case an input power signal received from a primary external DC power source or rechargeable battery connected to the primary device port (143) is directed to the DC power bus (110) without power conversion. Likewise when a primary external power load or rechargeable DC battery to be charged is connected to primary device port (143) an output power signal received from the DC power bus (110) is directed to primary device port (143) without power conversion.

Referring now to FIG. 5, each reconfigurable converter power circuit (151, 152) can be configured as a power converting output power channel (230) comprising power converting output conductive pathway (231) by opening switches (255) and (257), closing switches (253) and (259), and configuring the one-way DC to DC power converter (220) for the required power conversion. In this case an output power signal received from the DC power bus (110) is directed to the input terminal (222) of DC to DC power converter (220). The DC to DC power converter is configured to perform whatever voltage conversion is required to convert the output power signal to a voltage that is compatible with powering whatever secondary external DC power device is connected to the corresponding secondary device port (141, 142). Additionally if needed, the DC to DC power converter (220) can be operated to modulate current amplitude of the output power signal being voltage converted. The power converted output power signal is directed from the output terminal (224) of the DC to DC power converter (220) to converter device port (141, 142). In this configuration, power characteristics of the output power signal are monitored by the converter circuit power sensor module (210) and the power characteristics at the DC power bus (110) are monitored by the power bus sensor module (112).

Referring now to FIG. 6, each reconfigurable converter power circuit (151, 152) can be configured as a power converting input power channel (232), comprising power converting input conductive pathway (233), by closing switches (255) and (257), opening switches (253) and (259), and configuring the DC to DC power converter (220) to make the necessary voltage conversion. In this case an input power signal received from a secondary external DC power source or rechargeable battery connected to one of the device port (141, 142) is directed to the input terminal (222) of the DC to DC power converter (220). The DC to DC power converter is configured to perform whatever voltage conversion is required to convert the input power signal to a bus compatible voltage and the converted input power signal is passed to the DC power bus (110). Additionally, if needed, the DC to DC power converter (220) can be operated to modulate the current amplitude of the input power signal being voltage converted. The power converted input power signal is delivered from the output terminal (224) to DC power bus (110). In this configuration, power characteristics of the input power signal are monitored by the converter circuit power sensor module (210) and the power characteristics at the DC power bus (110) are monitored by the power bus sensor module (112).

Referring now to FIG. 7, each reconfigurable converter power circuit (151, 152) can be configured to a bus-compatible power channel (234), comprising bus-compatible conductive pathway (235), by opening switches (257) and (259), closing switches (253) and (255), and turning off one-way DC to DC power converter (220). In this configuration the power channel (234) is bi-directional such that any external power device that has a bus compatible operating voltage can be connected to the DC power bus (110) without power conversion. In the case where the secondary power device connected to a secondary device port is an external DC power source or a rechargeable DC battery having available charged stored thereon, an input power signal can be directed to the DC power bus (110) without power conversion. Conversely when the secondary power device connected to a secondary device port is an external DC power load or rechargeable battery than can accept charging power, an output power signal can be directed from the DC power bus (110) to the connected external power device without power conversion.

Table 1 includes configuration of the configurable switches and of DC to DC power converter (220) corresponding with the three configurations of the reconfigurable converter power circuits (151, 152) described above.

TABLE 1

| Reconfigurable converter power circuit (151, 152) power channel configuration | Power control element | Configuration |
|---|---|---|
| Power converting output power channel (230) (FIG. 5) | Switch 1 (255) | Open |
| | Switch 2 (253) | Closed |
| | Switch 3 (259) | Closed |
| | Switch 4 (257) | Open |
| | Power converter (220) | On |
| Power converting input power channel (232) (FIG. 6) | Switch 1 (255) | Closed |
| | Switch 2 (253) | Open |
| | Switch 3 (259) | Open |
| | Switch 4 (257) | Closed |
| | Power converter (220) | On |
| Bus compatible power channel (234) FIG. (7) | Switch 1 (255) | Closed |
| | Switch 2 (253) | Closed |
| | Switch 3 (259) | Open |
| | Switch 4 (257) | Open |
| | Power converter (220) | Off |
| Initial State | Switch 1 (255) | Open |
| | Switch 2 (253) | Open |
| | Switch 3 (259) | Open |
| | Switch 4 (257) | Open |
| | Power converter (220) | Off |

6.3.8 External Power Devices

External DC power devices can be connected to any one of the device ports described above. An external DC power device includes a primary external DC power device (163) interfaced with primary device port (143) and one or more secondary external DC power devices (161, 162), each interfaced with a different converter device port (141, 142). External power devices include DC power loads, DC power sources and rechargeable DC batteries. Rechargeable DC batteries can be used as a DC power source during discharge or as a DC power load or charging load during charging. Generally a DC power load has minimum power amplitude or minimum power load required to operate the power load. In addition the DC power load characteristics may include a peak power load required during some operating states. For DC power loads, the energy management schema is configured to at least allocate the minimum power and if the instantaneous power available from the DC power bus does not provide at least the required minimum power load the DC power load is not connected to the power bus. Otherwise each power load connected to a device port is connected to the power bus and allocated at least the minimum power load.

In some instances, a DC power load includes a rechargeable battery installed therein and it is the rechargeable battery that is interfaced to a device port and not the power load. In this case the energy management schema classifies the connected power device as a rechargeable battery and manages power allocation to the rechargeable battery and not to the power load.

For DC power sources, and rechargeable DC batteries that have a favorable state of charge (SoC) the energy management schema is configured to select the best available power source or rechargeable DC batteries to power the DC power bus and to connect at least one power sources to the DC power bus, however two or more power sources can be connected to the power bus at the same time. For rechargeable DC batteries that have an unfavorable state of charge, these devices are treated as charging loads and the energy management schema is operable to direct any unallocated power, e.g. not allocated to a DC power load, to one or more rechargeable DC batteries that have an unfavorable state of charge. However in this case there is no minimum power allocation for a charging load.

More generally, the digital data processor and energy management schema operating thereon are operable to select which external power devices to connect to the DC power bus or to disconnect from the DC power bus e.g. after communicating with the external power device or in response to changes in the power network. Additionally the digital data processor and energy management schema are operable to deliver power to or receive power from any one of the external DC power devices connected to any one of the device ports as warranted by instantaneous characteristics of the power network. As such the power manager and all the connected external DC power devices comprise a power network for exchanging power from one external power device to another while also consuming power to operate the components of the power manager and due to power losses due to power conversions being performed by the DC to DC power converters. Moreover, the power network can be changed when a user disconnects one external DC power device and replaces it with another. Additionally as charging power is delivered to connected rechargeable DC batteries and or removed from connected rechargeable DC batteries the state of charge of each connected DC battery is changed thereby changing instantaneous power conditions of the entire power network.

External DC power sources can include any source of DC power, for example: a solar blanket or fuel cell; a vehicle battery or the like; a wind, water, or mechanical driven power generator; an AC power grid source connected to a device port over an external AC to DC power convertor; a DC power source connected to a device port over an external DC to DC power convertor; or the like, as long as the input DC power voltage is either compatible with the instantaneous DC voltage of the DC power bus or can be converted to a bus compatible voltage by one of power converters of the reconfigurable converter power circuits (151, 152).

Power loads can be connected to the DC power bus (110) to receive power therefrom as long as the power load is either compatible with the instantaneous DC voltage of the DC power bus or can be converted to a bus compatible voltage by one of power converters of the reconfigurable converter power circuits (151, 152). Typical power loads include a DC power device such as most battery operated or DC powered portable devices, such as computers, audio systems including hand held radios, telephones or smart phones, other telecommunications equipment, instruments including navigation systems, weapons, systems, night vision and other photo sensing devices, medical devices, power tools, DC lighting, vehicle power loads, or the like.

Rechargeable DC batteries can be connected to the DC power bus (110) to receive power therefrom or deliver power thereto as long as rechargeable battery voltage is either compatible with the instantaneous DC voltage of the DC power bus or can be converted to a bus compatible voltage by one of power converters of the reconfigurable converter power circuits (151, 152). A rechargeable DC battery can be discharged to the DC power bus as a power source or charged by the DC power bus (110) when unallocated power is available therefrom.

As noted above the DC voltage of the DC power bus is matched to the operating voltage of whatever external DC power device is connected to the primary device port (143). Thus according to one aspect of the present invention a user can connect a DC power source to the primary device port to receive all the source input power without power conversion in order to avoid power converting an input power source and therefore avoiding power conversion losses due to power converting the input power source.

6.4 Exemplary Operating Modes

The following Examples of operational modes are provided to illustrate certain aspects of the present invention and to aid those of skill in the art in practicing the invention. These Examples are in no way to be considered to limit the scope of the invention in any manner.

6.4.1.1 First Exemplary Operating Mode

In a first exemplary, non-limiting operating mode, at least two external DC power devices (161, 162, 163) are connected to device ports of a power manager (100) but the device ports are not yet connected to the power bus (110) over a corresponding power circuit (151, 152, 153).

Figure 8:
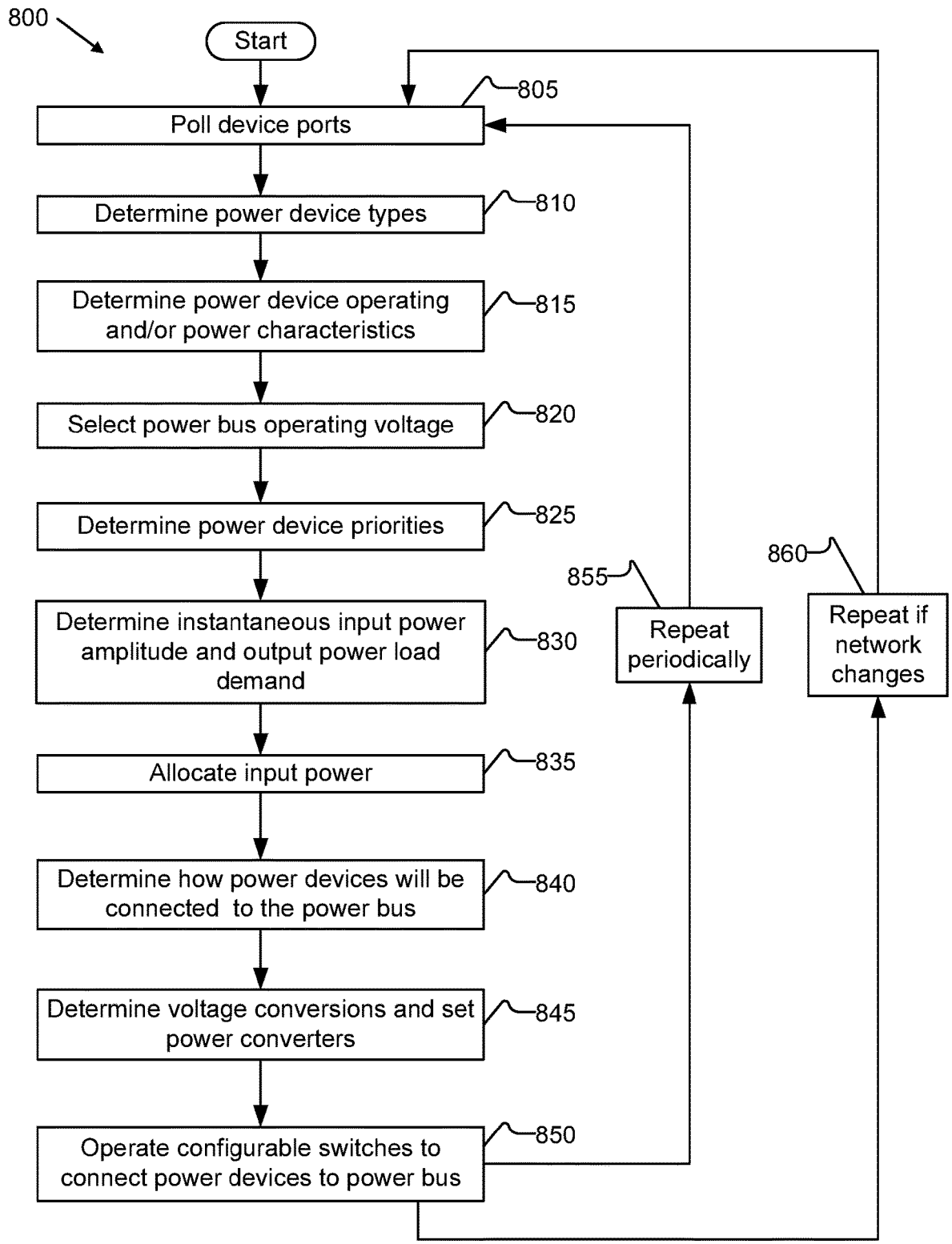
FIG. 8 depicts an exemplary flow diagram depicting a non-limiting exemplary power manager operating mode according to one aspect of the present invention.

Referring now to FIG. 8, in a step (805) the digital processor (120), according to an energy management schema program operating thereon, polls each device port using communication channels (130) to determine if an external power device is connected to the device port.

In a step (810) the digital data processor determines a device type for each external DC power device connected to a device port.

In a step (815) the digital data processor determines an operating voltage range and other operating and or power characteristics of each external DC power device connected to a device port.

In one non-limiting operating mode related to steps (805) through (815), the device type and the other power characteristics of each external DC power device (161, 162, 163) are read from digital data stored on the external DC power device or stored on a smart cable or other digital data processor or data storage device reachable by the digital processor (120).

In another non-limiting operating mode related to steps (805) through (815), the device type and the other power characteristics are determined at least in part from information obtainable from one or more device port sensors (210, 211, 212) and/or from information stored on the memory module (122). In one example operating mode the device type and other power characteristics are based on device port sensor information such as signal voltage, current amplitude, and/or power amplitude measurements which can be measured without connecting the device port to the power bus. In addition the energy management schema is operable to compare the device port sensor information with power characteristics of various external DC power device types that are stored in a look-up table, or the like, on the memory module (122). As a result of the comparison of the sensor information and look-up table data the energy management schema can determine a device type and the power characteristics of the external DC power device without reading digital data from the connected external power device.

In a step (820) the digital data processor (120) uses the energy management schema to select an operating voltage of the DC power bus (110). In all cases where an external power device (163) is connected to the primary device port (143), the operating voltage of the DC power bus (110) is matched to the operating voltage of the primary external DC power device (163). In cases where there is no primary external DC power device (163) connected to the primary device port (143), a power network is still established as long as the power network includes at least two secondary external DC power devices (161, 162) with each DC power device connected to a different secondary converter device port (141) or (142). However if a power network is not established or if a more efficient configuration is available, an error message may be generated by the digital data processor to instruct a user to connect at least one external DC power device to the primary device port.

In a step (825) the digital data processor (120), using the energy management schema, determines a device priority, if any, for each external DC power device. The device priority may be read from the external power device or may be assigned by the energy management schema according one or more default priority settings and/or instantaneous network conditions.

In a step (830) the digital data processor (120) determines the instantaneous input power amplitude and the instantaneous output power load demand of the present power network.

In a step (835) the digital data processor (120) allocates available input power to one or more power loads connected to a device port and allocates any unallocated power to charge one or more rechargeable DC batteries connected to a device port.

In a step (840) the digital data processor (120) determines how each external DC power device will be connected to the DC power bus, e.g. over the primary power channel, or over one leg of one of the reconfigurable power channels (151, 153).

In a step (845) the digital data processor (120) determines any voltage conversions that need to be made in order to connect each secondary power device (161, 162) to the DC power bus (110) and sets appropriate voltage conversion settings for each of the DC to DC power converters (220, 221).

In a step (850) the digital data processor (120) operates one or more of the configurable switches (261) on the primary power channel (153) and or (253, 255, 257, and 259) on the reconfigurable power channels (151, 151) as required to connect appropriate external DC power devices to the power bus over the selected circuit leg and or to disconnect appropriate external DC power devices from the power bus as required to allocate power according to the power allocation plan established by the energy management schema.

In a step (855) the above described steps are repeated at a refresh rate of 20 to 100 msec with the exception that during the initial state prior to repeating step (805) some or all of the device ports are already connected to the DC power bus (110), the type and power characteristics of each external power device and the operating voltage of the DC power bus (110) already may be known and some or all of the switch positions and DC to DC power conversion settings can be maintained if warranted by the present state of the power network.

In a step (860) the above described steps are repeated whenever there is a change in the network configuration, e.g. when a user physically connects an external DC power device to or disconnects an external DC power device from the power manager (100) or if the power bus sensor module (112) detects a low bus voltage condition that is below a threshold operating DC power bus voltage.

As noted above, an external DC power load is allocated the full power load demanded thereby unless the full power load allotment is not available. When the full power load allotment is not available, the external DC power load is disconnected from the DC power bus if it was already connected, or the external DC power load is not connected to the power bus if it had not been previously connected.

Also as noted above: each external rechargeable DC battery is characterized either as a power source, from which stored energy is drawn to power the DC power bus (110), or as an energy storage device, to which energy is delivered to increase the state of charge of the rechargeable DC battery. However unlike power loads, rechargeable DC batteries can be charged without allocating full charging power, e.g. trickle charged. In other words rechargeable batteries are charged with whatever level of unallocated power amplitude is available, as long as the available power amplitude does not exceed the batteries' maximum charging rate.

Thus the energy management schema operates to determine instantaneously available input power amplitude from all external DC power sources and/or rechargeable DC batteries that are connected to a device port and to determine an instantaneous output power demand or load required to meet the full power load of all DC power loads connected to a device port. Thereafter the energy management schema operates to allocate a full power load to as many DC power loads as can be powered by the instantaneously available power. Once all or as many of the power DC loads that can be powered have been allocated full power, all external DC power loads that did not receive a power allocation are disconnected from the power bus (110). Thereafter if there is any unallocated power left over, the unallocated power is distributed to one or more rechargeable batteries, if any, that are connected to device ports. Additionally when there is insufficient input power available from a power source to power high priority power loads, the energy management schema is operable to discharge one or more rechargeable DC batteries connected to device ports in order to power the high priority power loads. In other words when additional input power is required to power DC power loads, rechargeable DC batteries are used as a DC power source by discharging one or more rechargeable DC batteries to the DC power bus in order to power DC power loads connected to device ports. Additionally the energy management schema is operable to discharge one or more rechargeable DC batteries connected to device ports in order to charge other rechargeable batteries connected to device ports, e.g. to level the state of charge of all the rechargeable batteries connected to device ports.

To select a power bus operating voltage, the digital data processor (120) polls the primary device port (143) to gather power characteristics of a connected primary power device (163). The digital data processor then sets an operating voltage of the DC power bus (110) to match the operating voltage of the primary external DC power device (163). In one example embodiment, the digital data processor (120) queries a look up table or the like stored in the associated memory module (122). The look-up table lists a plurality of discreet DC bus voltage operating voltages, including a default bus voltage operating voltage. The digital data processor then selects an operating voltage of the DC bus from the list of discreet operating voltages with the selected discreet operating voltage most closely matched to the operating voltage of the primary external DC power device (163).

The preselected list of bus voltage operating points is chosen to match the operating voltage ranges of standard primary external DC power devices (163) that are commonly used with the power manager. In one non-limiting example embodiment, the power manager is designed for military use and includes operating voltage ranges typical of hand held or man-portable military devices and portable military batteries. Such man-portable devices may include radios, computers, navigation systems, and instruments each having an operating voltage range centered on any one of 6, 12, 24, 30, and 42 VDC. The operating voltage ranges of the DC to DC power converters (220, 221) are selected to provide voltage conversion over the operating voltage ranges of the standard primary external DC power devices (163) that are commonly used with the power manager which in the present non-limiting example embodiment is a voltage range of between 5 and 50 VDC; however a larger range is usable without deviating from the present invention.

More specifically any external DC power device having an operating voltage range with its mid-point that falls between 5 and 50 volts DC can be connected to the DC power bus over any of the device ports (141, 142, and 143). In a preferred embodiment the power converters (220, 221) are configured for making power conversions over a voltage range of 5 to 50 VDC. Thus with the DC bus voltage set to 5 VDC the power converters are capable of converting the 5 VDC bus voltage to any voltage in the range of 5 to 50 VDC at each secondary device port. Similarly with the DC bus voltage set to 50 VDC, the power converters are capable of converting the 50 VDC bus voltages to any voltage in the range of 5 to 50 VDC at each secondary device port. In other embodiments, the power manager (100) can be constructed to operate at other bus voltage ranges depending on the application and the availability of appropriate DC to DC power converters.

6.4.1.2 Exemplary Operating Mode for a First Network Configuration

Still referring to FIG. 8 and steps (805) through (860), during steps (805)-(815) the digital data processor (120) determines that a primary external DC power device (163) interfaced with a primary device port (143) is a DC power source with an operating voltage approximately centered on 24 VDC, that a secondary external DC power device (161) connected to converter device port (141) is a rechargeable DC battery with an operating voltage approximately centered on 12 VDC, and that a secondary external DC power device (162) connected to converter device port (142) is a DC power load having an operating voltage approximately centered around 32 VDC.

In steps (820) and (825) the energy management schema sets the power bus DC operating voltage at 24 VDC and determines that the DC power source connected to the primary device port (143) has the highest source priority and that the DC power load connected to device port (142) has the highest load priority.

In steps (830) and (835) the energy management schema determines the instantaneous input power available from the DC power source connected to device port (143) as well as the instantaneous input power available from the rechargeable DC battery connected to the device port (141). The energy management schema determines the instantaneous power load being demanded by the DC power load connected to the device port (142) and based on the State of Charge (SoC) and energy storage capacity of the rechargeable DC battery connected to the device port (141) determines an instantaneous power load associated with the rechargeable DC battery. Thereafter the instantaneous input power is allocated first to the DC power load connected to device port (142) because the DC power loads has the highest load priority, and second to recharge the rechargeable DC battery connected to device port (141). If the instantaneous input power amplitude meets or exceeds the instantaneous power load being demanded by the DC power load, the full instantaneous power load being demanded by the DC power load is allocated. If not, no power is allocated to by the DC power load connected to the device port (142). If the instantaneous input power amplitude exceeds the instantaneous power load being demanded by the DC power load, the excess unallocated power is allocated to recharge the rechargeable DC battery connected to the device port (141). If the instantaneous input power amplitude is less than the instantaneous power load being demanded by the DC power load, no power is allocated to the DC power load and the instantaneous input power amplitude is fully allocated to recharge the rechargeable DC battery connected to the device port (141). In cases where neither solution is workable, e.g. when the instantaneous input power amplitude exceeds the power demand on the network or may damage the network, the instantaneous input power is rejected and a new solution is attempted, e.g. to use the rechargeable DC battery connected to the device port (141) to power the DC power load connected to the device port (142).

In steps (840)-(850) the energy management schema determines a connection scheme for connecting each device to the DC power bus (110) according to the power allocation scheme. Along the primary power channel (153) the switch (261) is closed to connect the primary device port (143) and the connected DC power source to the power bus. This step powers the DC power bus at 24 VDC as provided by the 24 VDC power source connected to the primary device port (143).

The reconfigurable power channel (152) is configured as shown in FIG. 5 by opening switches (257) and (255) and closing switches (253) and (259). The DC to DC power converter (220) is set to receive an input power signal from the DC power bus at 24 VDC and to step the input power signal up to 32 VDC in order to power the 32 VDC power load connected to the device port (142).

The reconfigurable power channel (151) is also configured as shown in FIG. 5 by opening switches (257) and (255) and closing switches (253) and (259). The DC to DC power converter (221) is set to receive an input power signal from the DC power bus at 24 VDC and to step the input power signal down to 12 VDC in order to recharge the 12 VDC rechargeable battery connected to the device port (141).

If at any time, the 12 VDC rechargeable DC battery connected to the device port (141) is used as a power source to allocate input power to the power bus, the reconfigurable power channel (152) is reconfigured as shown in FIG. 6 by opening switches (253) and (259) and closing switches (255) and (257). The DC to DC power converter (221) is set to receive an input power signal from the rechargeable DC battery connected to the device port (141) at 12 VDC and to step the input power signal up to 24 VDC in order to deliver input power to the power bus (110).

In a further exemplary operating example, each of the DC to DC power converters is operable to modulate current amplitude of a power signal passing through the DC to DC power converter. In particular the current amplitude of a power signal entering the power converter input terminal (222) may be passed through the DC to DC power converter substantially unmodulated, i.e. at full current amplitude, of substantially fully modulated, i.e. substantially zero current amplitude.

6.4.1.3 Exemplary Operating Mode for a Second Network Configuration

Still referring to FIG. 8 and steps (805) through (860), during steps (805)-(815) the digital data processor (120) determines that a primary external DC power device (163) interfaced with a primary device port (143) is a DC power source with an operating voltage approximately centered on 24 VDC, that a secondary external DC power device (161) connected to converter device port (141) is a rechargeable DC battery with an operating voltage approximately centered on 24 VDC, and that a secondary external DC power device (162) connected to converter device port (142) is a rechargeable DC battery with an operating voltage approximately centered on 24 VDC.

In steps (820) and (825) the energy management schema sets the power bus DC operating voltage at 24 VDC and determines that the DC power source connected to the primary device port (143) has the highest source priority and that each of rechargeable DC batteries connected to device ports (141, 142) have an equal load priority.

In steps (830) and (835) the energy management schema determines the instantaneous input power available from the DC power source connected to device port (143) as well as the instantaneous input power available from each of the rechargeable DC batteries connected to the device ports (141, 142). The energy management schema determines the instantaneous power load being demanded by each of the rechargeable DC batteries connected to the device ports (141, 142), e.g. based on the State of Charge (SoC) and energy storage capacity of each rechargeable DC battery connected to the device port (141, 142). Thereafter the instantaneous input power may be equally divided between the two rechargeable DC batteries, may be fully allocated to one or the other of the two rechargeable DC batteries, or may be partially allocated to each of the two rechargeable DC batteries in unequal portions.

In steps (840)-(850) the energy management schema determines a connection scheme for connecting each device to the DC power bus (110) according to the power allocation scheme. Along the primary power channel (153) the switch (261) is closed to connect the primary device port (143) and the connected DC power source to the power bus. This step powers the DC power bus at 24 VDC as provided by the 24 VDC power source connected to the primary device port (143).

The reconfigurable power channels (151, 152) are both configured as shown in FIG. 7 by opening switches (257) and (259) and closing switches (253) and (255). The DC to DC power converter (220) of each circuit (151, 152) is not in use so may be powered down.

In an alternate connection scheme, the reconfigurable power channels (151, 152) are both configured as shown in FIG. 5 by opening switches (255) and (257) and closing switches (253) and (259). In this case the DC to DC power converter (220) is set for no voltage change and is still usable to attenuate current without a DC to DC voltage conversion. If at any time, one or both of the 24 VDC rechargeable DC batteries connected to the device port (141, 142) is used as a power source to allocate input power to the power bus, the reconfigurable power channels (151, 152) do not require reconfiguration as long as the DC power bus operating voltage is 24 VDC.

6.4.1.4 Exemplary Operating Mode for a Third Network Configuration

Still referring to FIG. 8 and steps (805) through (860), during steps (805)-(815) the digital data processor (120) determines that a primary external DC power device (163) interfaced with a primary device port (143) is a DC power load with an operating voltage approximately centered on 12 VDC, that a secondary external DC power device (161) connected to converter device port (141) is a rechargeable DC battery with an operating voltage approximately centered on 24 VDC, and that a secondary external DC power device (162) connected to converter device port (142) is a rechargeable DC battery with an operating voltage approximately centered on 32 VDC.

In steps (820) and (825) the energy management schema sets the power bus DC operating voltage at 12 VDC and determines that the DC power load connected to the primary device port (143) has the highest load priority and that each of the rechargeable DC batteries connected to device ports (141, 142) have an equal load and an equal source priority.

In steps (830) and (835) the energy management schema determines the instantaneous input power available from each of the rechargeable DC batteries connected to device ports (141) and (142). The energy management schema determines the instantaneous power load being demanded by each of the rechargeable DC batteries connected to the device ports (141, 142), e.g. based on the State of Charge (SoC) and energy storage capacity of each rechargeable DC battery connected to the device port (141, 142). Thereafter the instantaneous input power available from one or both of the rechargeable DC batteries connected to the device ports (141, 142) is allocated to the power the DC power load connected to the primary device port (143).

In steps (840)-(850) the energy management schema determines a connection scheme for connecting each external power device to the DC power bus (110) according to the power allocation scheme. Along the primary power channel (153) the switch (261) is closed to connect the primary device port (143) and the connected DC power load to the power bus. The reconfigurable power channels (151, 152) are both configured as shown in FIG. 6 by opening switches (253) and (259) and closing switches (255) and (257). The DC to DC power converter (221) associated with reconfigurable power circuit (151) is set to receive an input power signal at 24 VDC from the rechargeable DC battery connected to the device port (141) and to step the input power signal down to 12 VDC in order to deliver input power to the power bus (110). The DC to DC power converter (220)

associated with reconfigurable power circuit (152) is set to receive an input power signal at 32 VDC from the rechargeable DC battery connected to the device port (142) and to step the input power signal down to 12 VDC in order to deliver input power to the power bus (110).

In order to meet the power demand of the DC power load connected to the primary device port (143) either one of the rechargeable DC batteries connected to secondary device ports (141) and (142) can be used exclusively by connecting one or the other to the DC power bus. Alternately, in order to meet the power demand of the DC power load connected to the primary device port (143) both of the rechargeable DC batteries connected to secondary device ports (141) and (142) can be connected to the DC power bus at the same time. In cases where the instantaneous input power available from one the rechargeable DC batteries connected to the device ports (141) and (142) exceeds the DC power load demanded by the DC power source connected to device port (143) any unallocated power is directed to the other rechargeable DC batteries by reconfiguring the associated reconfigurable circuit to receive DC power from the power bus, e.g. as is shown in FIG. 5. However this action is controlled by the energy management schema by configuring reconfigurable power channels to distribute unallocated instantaneous input power to selected rechargeable DC batteries based on the state of charge and charge capacity of the connected rechargeable DC batteries. According to a further exemplary operating mode one or both of the DC to DC power converters is set to modulate current amplitude as a means of modulating instantaneous input power being delivered to the DC power bus (110). According to a further exemplary operating mode DC power is only drawn from the rechargeable DC battery having the highest instantaneous input power available. According to another exemplary operating mode DC power is only drawn from the rechargeable DC battery having the lowest instantaneous input power available.

6.4.2 Maximum Power Point Tracking Exemplary Operational Mode

In a further non-limiting exemplary network configuration and operating mode, a DC power load or rechargeable DC battery having a low state of charge is connected to the primary device port (143). A first high priority power source such as a renewable energy source, e.g., a solar blanket or wind turbine, or the like, that tends to have a continuously fluctuating voltage and therefore continuously variable power amplitude is connected to secondary converter device port (141). A second high priority power source such as a renewable energy source, e.g., a solar blanket or wind turbine, or the like, that tends to have a continuously fluctuating voltage and therefore continuously variable power amplitude is connected to a secondary converter device port (142).

In one operating mode the energy management schema sets the DC bus voltage to match the operating voltage of the DC power load or of the low state of charge rechargeable DC battery and connects all of the external power device to the DC power bus using appropriate power conversion settings as described above.

In a further exemplary operating mode, the digital data processor (120) is operable to run Maximum Power Point Tracking (MPPT) algorithms to modulate input power from one or both of the high priority DC power sources connected to the converter device ports (141, 142). The MPPT algorithms are usable to convert input power from the variable voltage secondary power sources (e.g. having time varying input power amplitude) to usable power having substantially constant voltage that is compatible with the operating voltage of the DC power bus (110). The operating voltage range of the input power source can be determined either by communicating with the input power source or may be inferred from sensor signal feedback. Once the input voltage range is determined the digital data processor (120) configures the reconfigurable converter power circuit (151, 152) corresponding to the converter device port (141, 142) as a power converting input power channel (232), as shown in FIG. 6, and provides set points to the DC to DC power converter (220, 221) to match the incoming voltage to the bus compatible operating voltage. Additionally each DC to DC power converter (220, 221) is operable to modulate input current amplitude between substantially zero throughput and full throughput. Thus the digital data processor (120) is operable to monitor input power amplitude at the power sensor (210, 211) and to modulate power output amplitude exiting the DC to DC power converters by varying current amplitude at the DC to DC power converter (220, 221).

It will also be recognized by those skilled in the art that, while the invention has been described above in terms of preferred embodiments, it is not limited thereto. Whereas exemplary embodiments include specific characteristics such as, for example, numbers of device ports, certain bus voltages and voltage ranges, power converter ranges, DC-to-DC power conversion, those skilled in the art will recognize that its usefulness is not limited thereto. Various features and aspects of the above described invention may be used individually or jointly. Further, although the invention has been described in the context of its implementation in a particular environment, and for particular applications (e.g. implemented within a power manager), those skilled in the art will recognize that its usefulness is not limited thereto and that the present invention can be beneficially utilized in any number of environments and implementations where it is desirable to selectively connect power devices to a common power bus and to manage power distributing and minimize power losses due to power conversions or other factors related to power parameters of power devices. Accordingly, the claims set forth below should be construed in view of the full breadth and spirit of the invention as disclosed herein.

What is claimed:

1. A DC to DC power manager comprising:
   a DC power bus;
   a digital data processor, a memory device in communication with the digital data processor and energy management schema operating on the digital data processor;
   a single primary device port;
   a primary power channel disposed between the single primary device port and the DC power bus and a primary switch operable by the digital data processor disposed along the primary power channel;
   one or more converter device ports each including a reconfigurable power channel disposed between the converter device port and the DC power bus;
   wherein each reconfigurable power channel includes a one-way DC to DC power converter having an input terminal and an output terminal and a plurality of converter legs each including a secondary switch, wherein the plurality of converter legs connect the DC power bus to one of the input terminal or the output terminal or connect the converter device port to one of the input terminal and the output terminal; and, wherein the one-way DC to DC power converter and each of the plurality of secondary switches is independently operable by the digital data processor to configure the reconfigurable power channel into one of three different power channel configurations for transferring power between the DC power bus and a corresponding one of the one or more converter device ports.

2. The DC to DC power manager of claim 1 wherein the digital data processor is operable to establish a power conversion setting for each one-way DC to DC power converter wherein the power conversion setting converts power received at the input terminal from a bus compatible voltage to a non-bus compatible voltage exiting from the output terminal.

3. A DC to DC power manager comprising:
a DC power bus;
a digital data processor, a memory device in communication with the digital data processor, and energy management schema operating on the digital data processor;
a primary power channel that does not include a DC to DC power converter disposed between a primary device port and the DC power bus;
a reconfigurable power channel disposed between a converter device port and the DC power bus that includes a one-way DC to DC power converter having an input terminal and an output terminal and a plurality of secondary switches each independently operable by the digital data processor to reconfigure the reconfigurable power channel;
wherein the energy management schema is configured to determine an operating voltage of a primary external DC power device interfaced with the primary device port and to select a bus voltage operating point that is matched with the determined operating voltage of the primary external DC power device and to modify a present bus voltage operating point when the determined operating voltage of the primary external DC power device differs from the present bus voltage operating point.

4. The DC to DC power manager of claim 3 wherein the reconfigurable power channel is configurable by the energy management schema to connect a secondary external DC power device interfaced with the converter device port to the DC power bus without a power conversion.

5. The DC to DC power manager of claim 3 wherein the reconfigurable power channel is configurable by the energy management schema to connect a secondary external DC power device interfaced with the converter device port to the input terminal.

6. The DC to DC power manager of claim 3 wherein the reconfigurable power channel is configurable by the energy management schema to connect a secondary external DC power device interfaced with the converter device port to the output terminal.

7. A DC to DC power manager comprising:
a DC power bus;
a digital data processor, a memory device in communication with the digital data processor, and energy management schema operating on the digital data processor;
a primary power channel that does not include a DC to DC power converter disposed between a primary device port and the DC power bus;
a reconfigurable power channel, disposed between a converter device port and the DC power bus that includes a one-way DC to DC power converter having an input terminal and an output terminal and a plurality of secondary switches each independently operable by the digital data processor to reconfigure the reconfigurable power channel;
wherein the energy management schema is configured to determine for the primary external DC power device interfaced with the primary device port and for a secondary external DC power device interfaced with the converter device port, an operating voltage, a device type and power characteristics thereof, to determine a State of Charge (SoC) when the device type is determined to be a rechargeable DC battery, and to select a bus voltage that is matched with the operating voltage of the primary external DC power device.

8. The DC power manager of claim 3 further comprising a bus power sensor module in communication with the digital data processor.

9. A DC to DC power manager comprising:
a DC power bus;
a digital data processor, a memory device in communication with the digital data processor, and energy management schema operating on the digital data processor;
a primary power channel that does not include a DC to DC power converter disposed between a primary device port and the DC power bus;
a reconfigurable power channel, disposed between a converter device port and the DC power bus, that includes a one-way DC to DC power converter having an input terminal and an output terminal and a plurality of secondary switches each independently operable by the digital data processor to reconfigure the reconfigurable power channel; and
an internal rechargeable battery configured to power the data processor and memory device and to receive charging power from an external DC power device interfaced with the primary device port or the converter device port;
wherein the energy management schema is configured to determine an operating voltage of a primary external DC power device interfaced with the primary device port and to establish a bus voltage that is matched with the operating voltage of the primary external DC power device.

10. The DC to DC power manager of claim 1 wherein the digital data processor is operable to establish a power conversion setting for the one-way DC to DC power converter wherein the power conversion setting converts power received at the input terminal from a non-bus completable voltage to a bus compatible voltage.

11. The DC to DC power manager of claim 1 wherein the one-way DC to DC power converter is operable to step up or step down power voltage between the input terminal and the output terminal.

12. The DC to DC power manager of claim 1 wherein the one way DC to DC power converter is operable to modulate current amplitude between the input terminal and the output terminal.

13. The DC to DC power manager of claim 1 wherein the energy management schema is configured to determine an operating voltage of a primary external DC power device interfaced with the primary device port and to establish a bus voltage that is matched with the operating voltage of the primary external DC power device.

14. The DC to DC power manager of claim 1 wherein for each reconfigurable power channel, one of the three different power channel configurations for transferring power between the DC power bus and a corresponding one of the one or more converter device ports is a bus compatible power channel that connects a secondary external DC power device having a bus compatible voltage to the power bus without passing through the one way DC to DC power converter.

15. The DC to DC power manager of claim 1 further comprising a secondary external DC power source having a non-bus compatible voltage interfaced with the converter device port, wherein the reconfigurable power channel connects the device converter device port to the input terminal.

16. The DC to DC power manager of claim 1 further comprising a secondary external power load having a non-bus compatible voltage interfaced with the converter port, wherein the reconfigurable power channel connects the device converter port to the output terminal.

17. The DC to DC power manager of claim 1 further comprising a primary channel power sensor in communication with the digital data processor, wherein the primary channel power sensor is positioned for sensing a power characteristic of a primary external DC power device interfaced with the primary device port.

18. The DC to DC power manager of claim 1 wherein each reconfigurable power channel further comprises a converter channel power sensor in communication with the digital data processor and positioned for sensing a power characteristic of a secondary external DC power device interfaced with a corresponding converter port.

19. The DC to DC power manager of claim 1 wherein each reconfigurable power channel comprises four operable switches each independently operable by the digital data processor.

20. The DC to DC power manager of claim 1 further comprising a digital communication network that extends from the digital data processor to the primary device port and to each of the one or more converter device ports.

21. The DC to DC power manager of claim 1 further comprising an enclosure formed by a plurality of enclosure walls joined together to enclose the power manager in a weather tight environment.

22. The DC to DC power manager of claim 1 wherein each of the primary device port and the one or more converter device ports provides a wired electrical interface that at least includes a power channel for interfacing with external DC power devices having a compatible wired electrical interface.

23. The DC to DC power manager of claim 22 wherein the wired electrical interface further includes a communication channel in communication with the data processor for interfacing with external DC power devices having a compatible wired communication interface.

* * * * *